Figure 1:
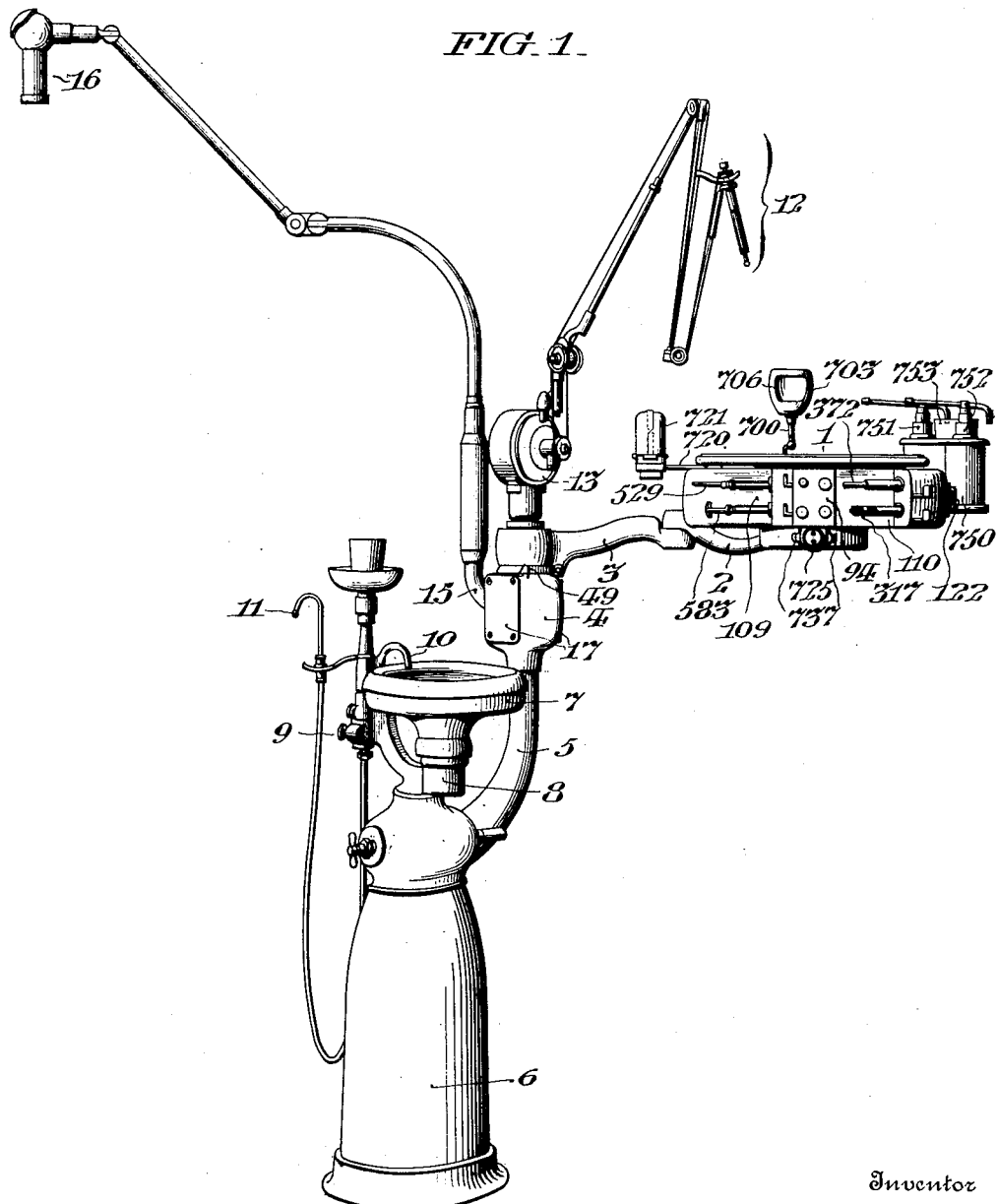

Sept. 4, 1934.  R. C. ANGELL  1,972,072
ACCESSORY TABLE
Filed May 21, 1928  18 Sheets-Sheet 1

Inventor
Robert C. Angell,
By Clifton G Hallowell
Attorney

Sept. 4, 1934. R. C. ANGELL 1,972,072
ACCESSORY TABLE
Filed May 21, 1928 18 Sheets-Sheet 2
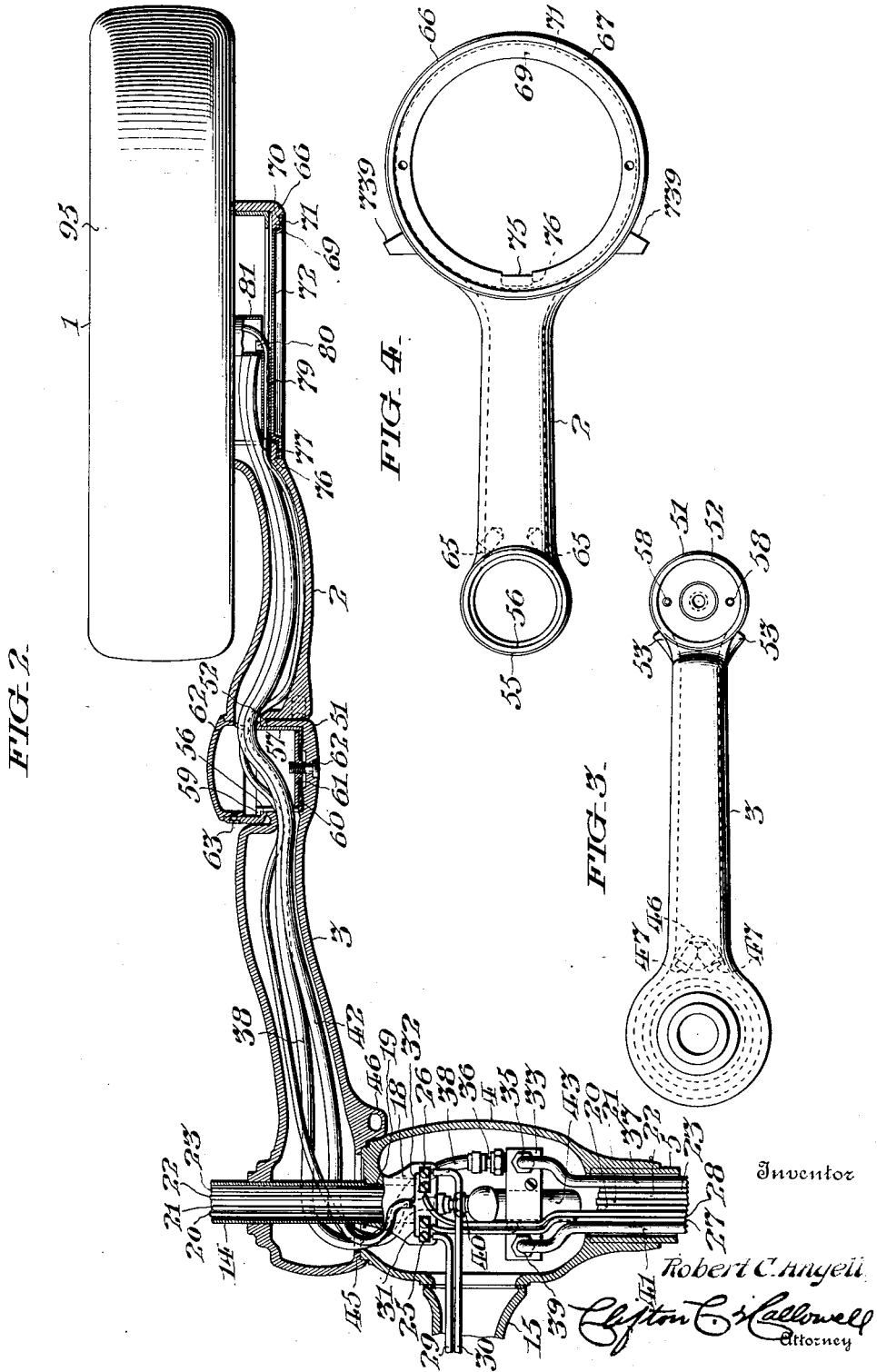

Sept. 4, 1934.   R. C. ANGELL   1,972,072
ACCESSORY TABLE
Filed May 21, 1928   18 Sheets-Sheet 3
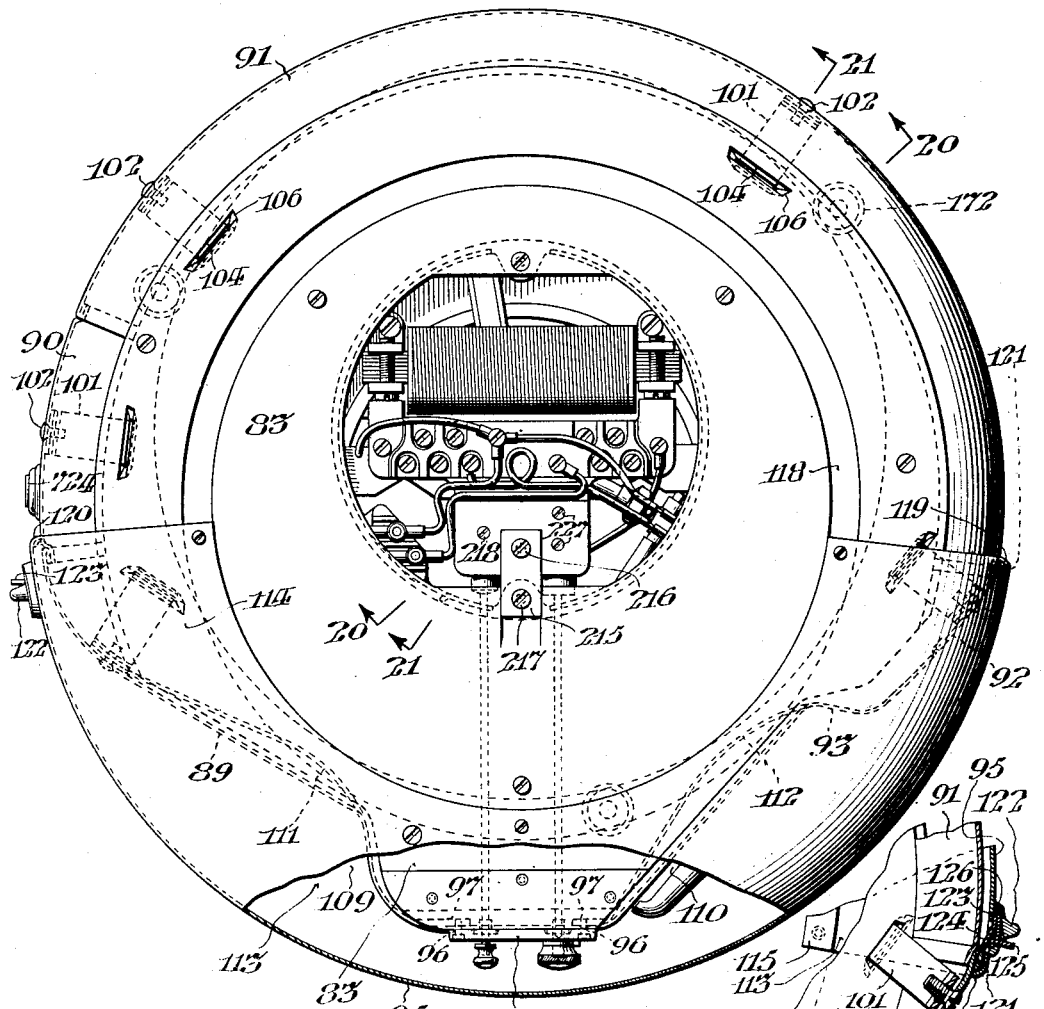
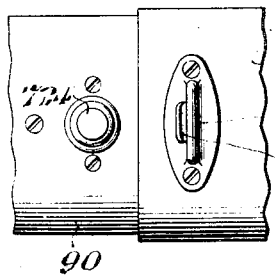

Sept. 4, 1934.    R. C. ANGELL    1,972,072
ACCESSORY TABLE
Filed May 21, 1928    18 Sheets-Sheet 4
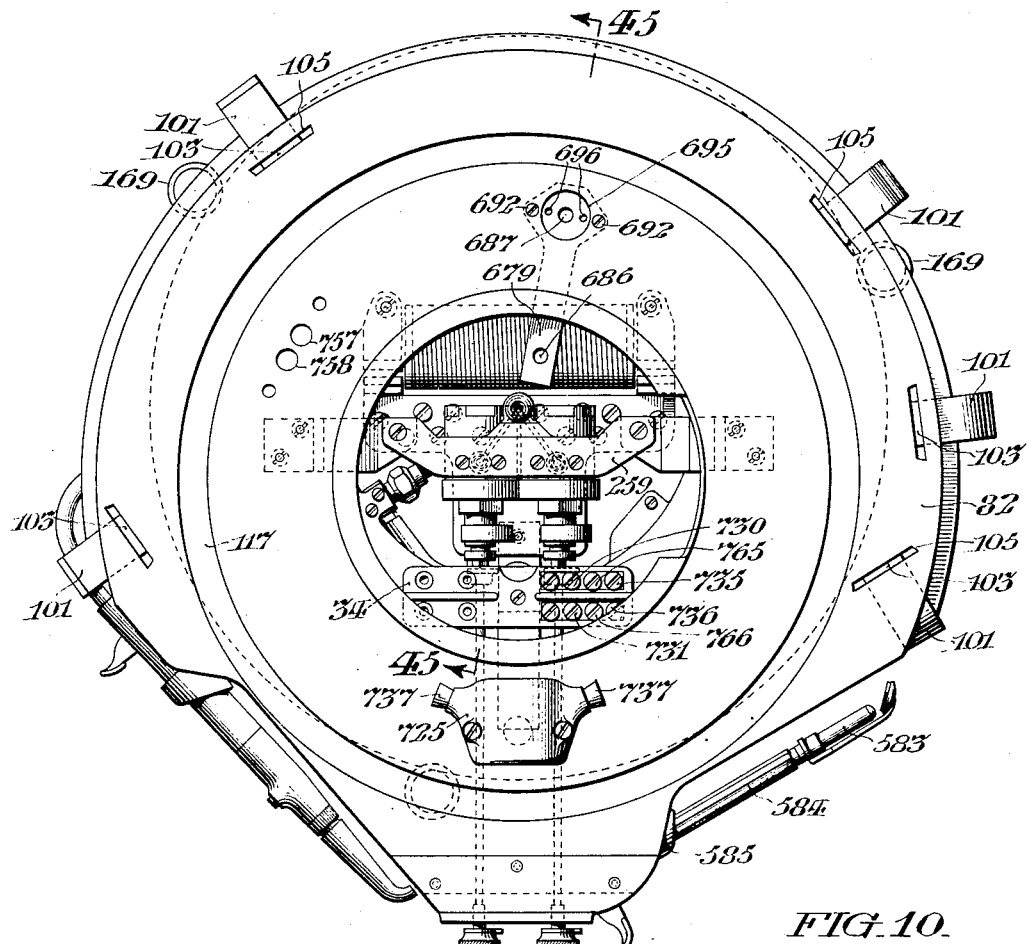
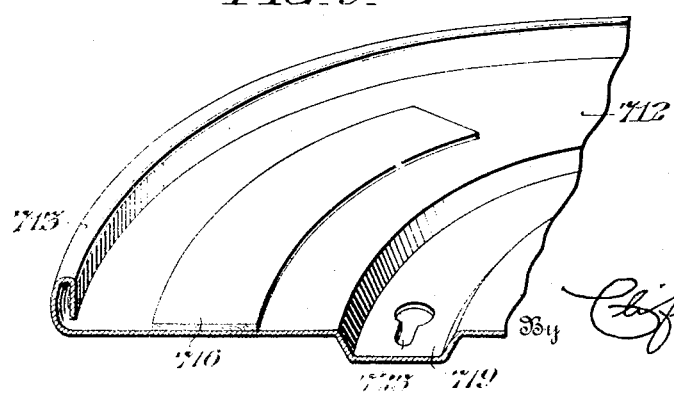
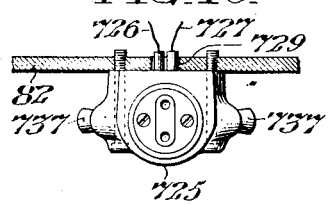

Sept. 4, 1934.   R. C. ANGELL   1,972,072
ACCESSORY TABLE
Filed May 21, 1928   18 Sheets-Sheet 5

Inventor
Robert C. Angell,
By Clifton C. Hallowell
Attorney

Sept. 4, 1934.  R. C. ANGELL  1,972,072
ACCESSORY TABLE
Filed May 21, 1928  18 Sheets-Sheet 6

Inventor
Robert C. Angell,
By Clifton C. Hallowell
Attorney

Sept. 4, 1934.   R. C. ANGELL   1,972,072
ACCESSORY TABLE
Filed May 21, 1928   18 Sheets-Sheet 7
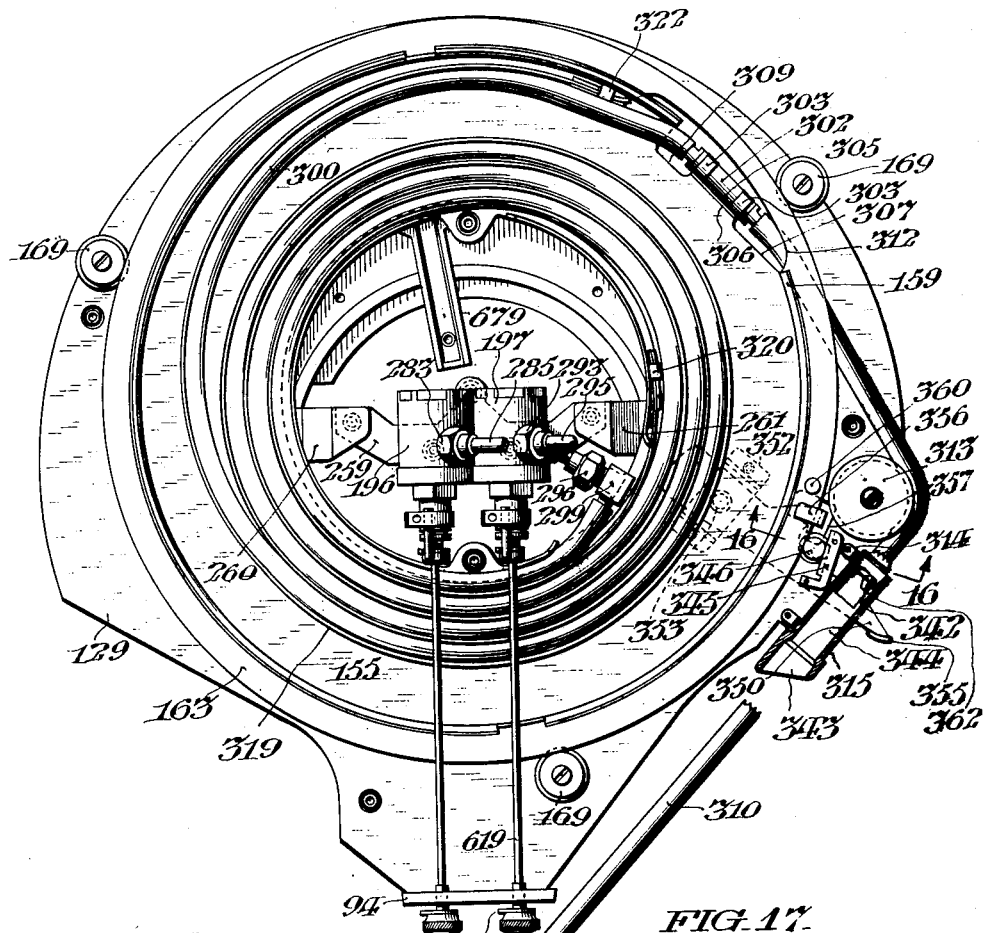
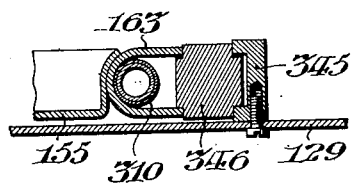
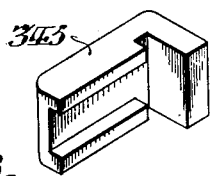
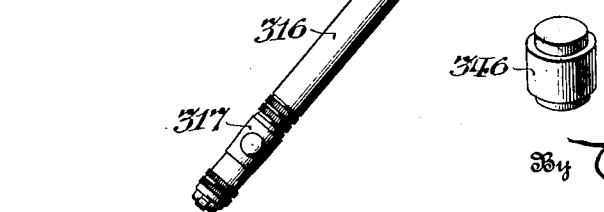
Inventor
Robert C. Angell,
By [signature]
Attorney

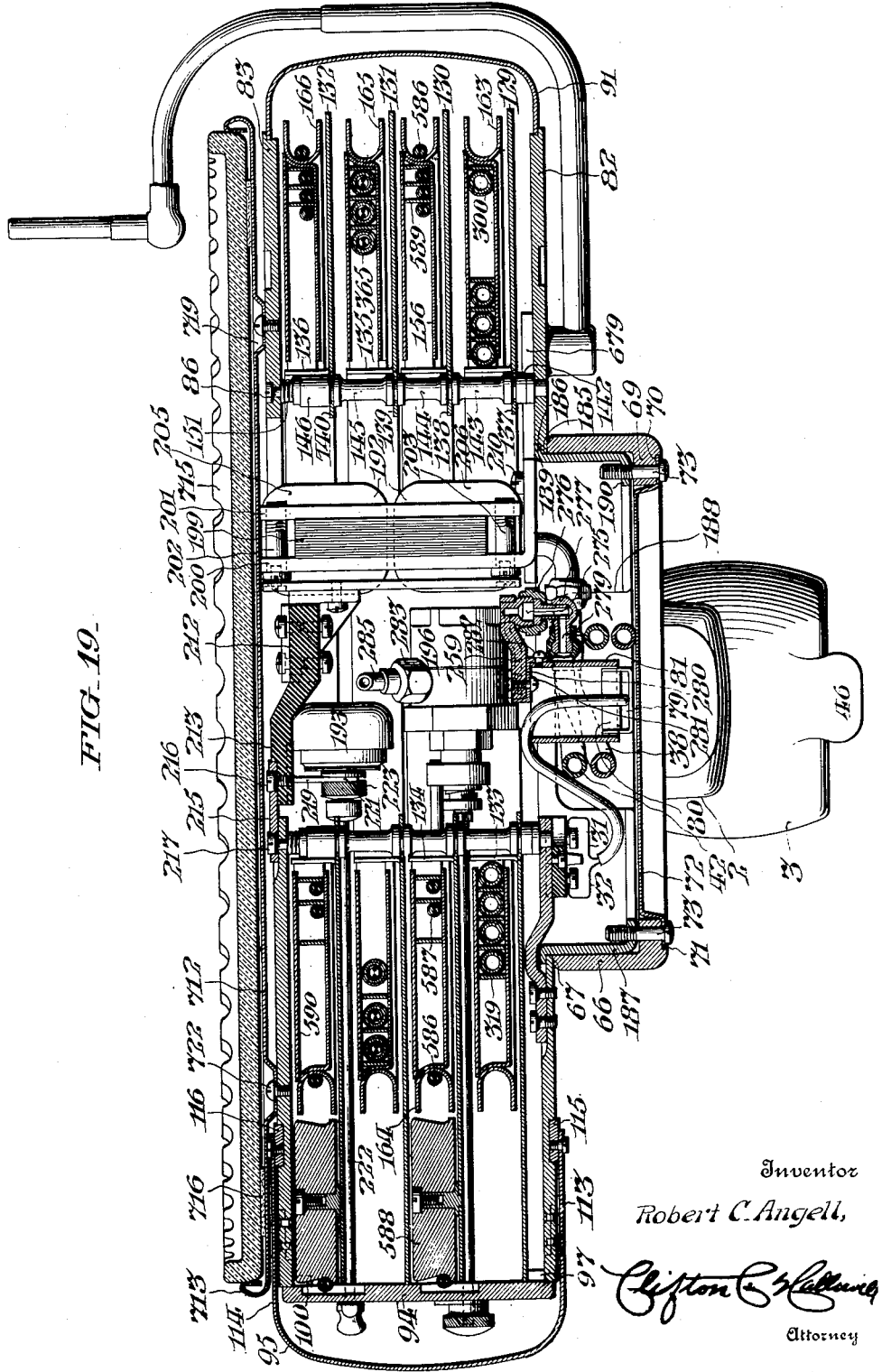

Sept. 4, 1934.  R. C. ANGELL  1,972,072
ACCESSORY TABLE
Filed May 21, 1928  18 Sheets-Sheet 9
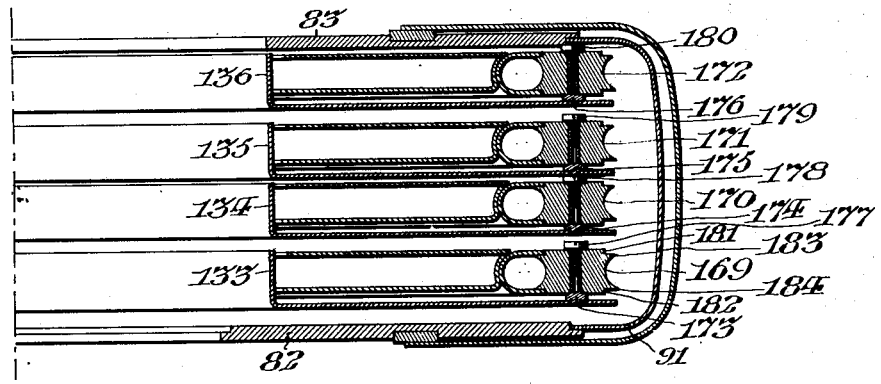
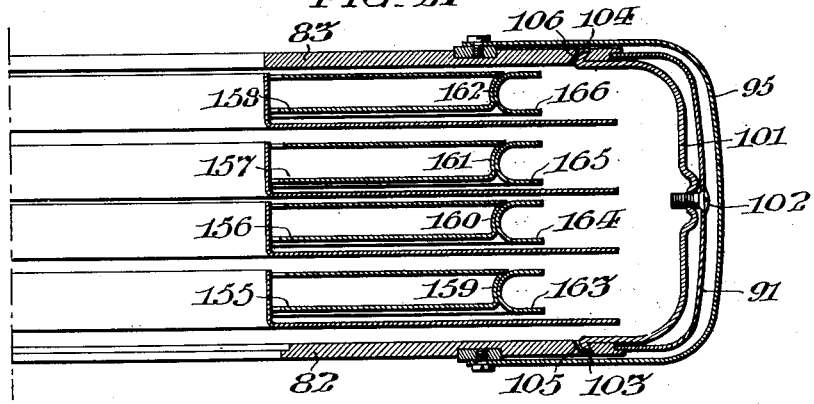
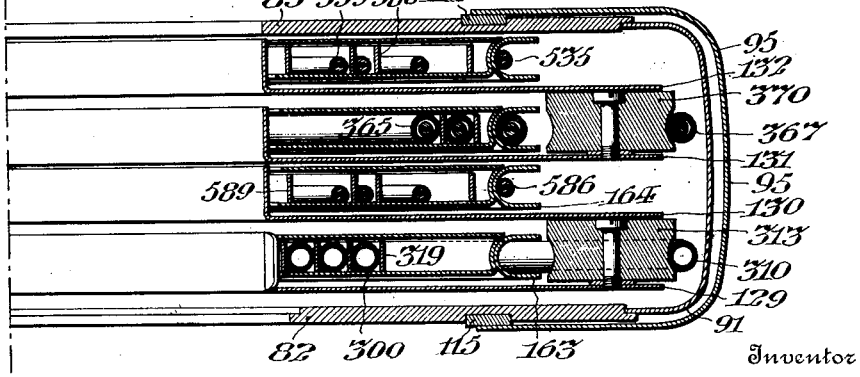

Sept. 4, 1934. R. C. ANGELL 1,972,072
ACCESSORY TABLE
Filed May 21, 1928 18 Sheets-Sheet 10
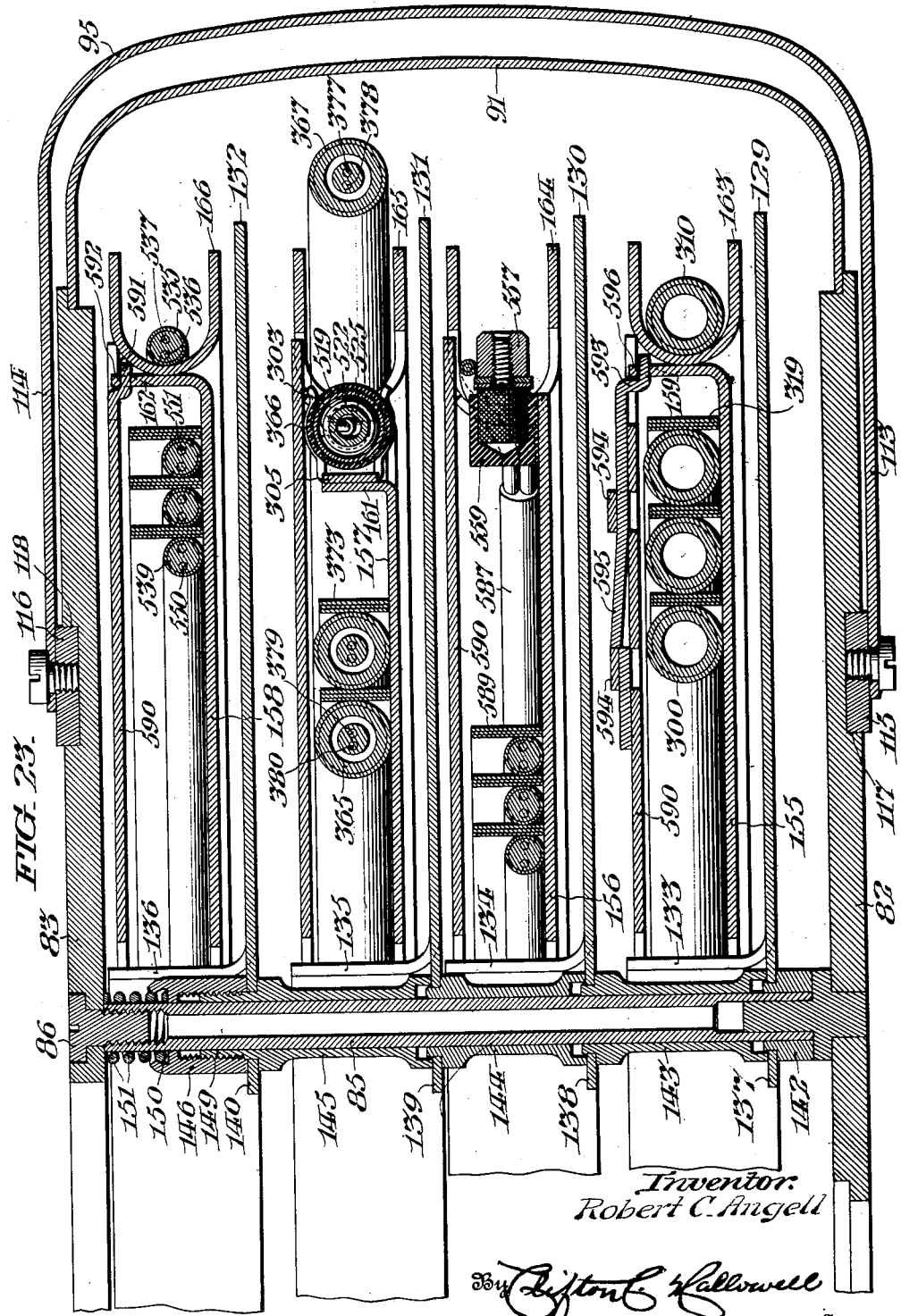

Sept. 4, 1934.　　　　R. C. ANGELL　　　　1,972,072
ACCESSORY TABLE
Filed May 21, 1928　　18 Sheets-Sheet 11
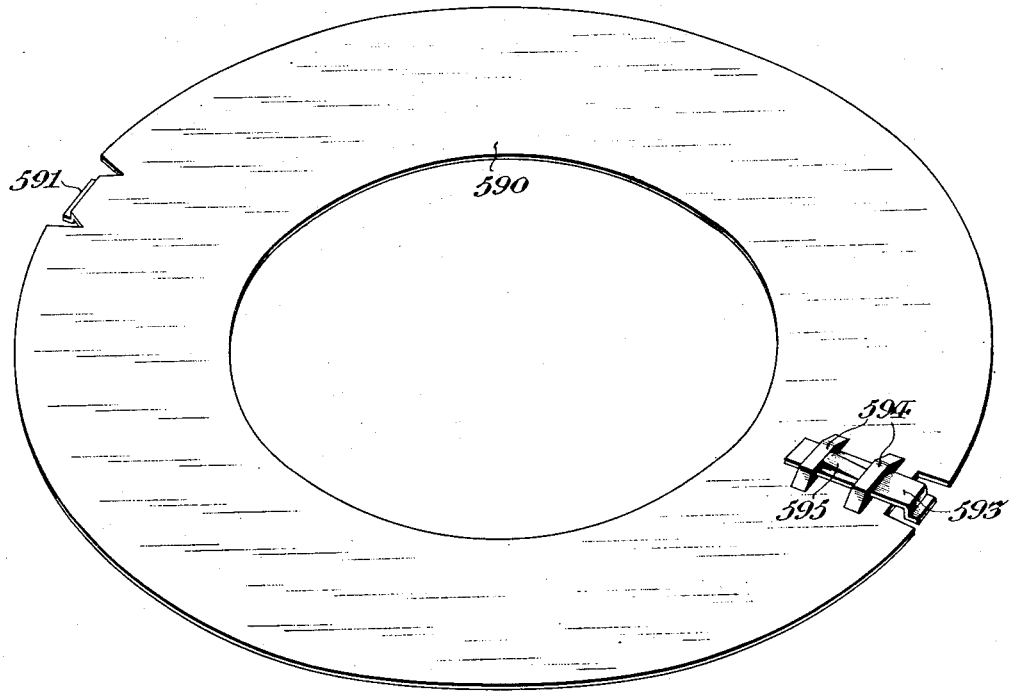
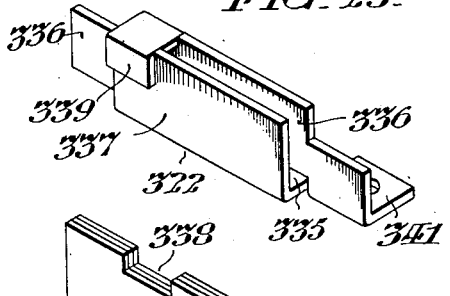
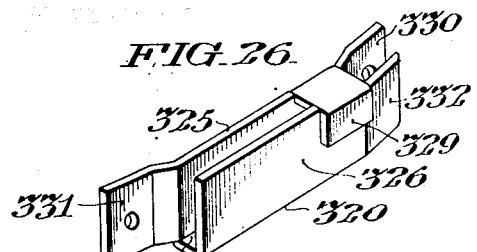
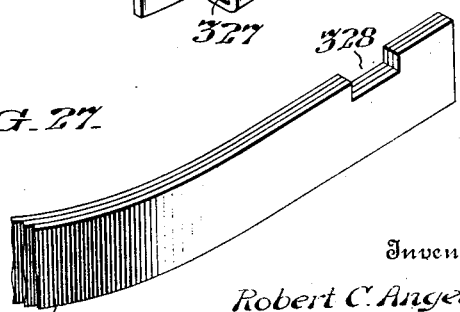
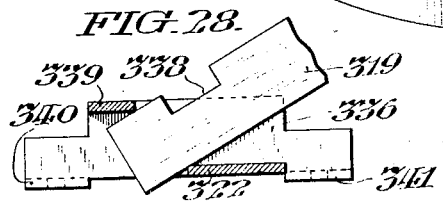
Inventor
Robert C. Angell,

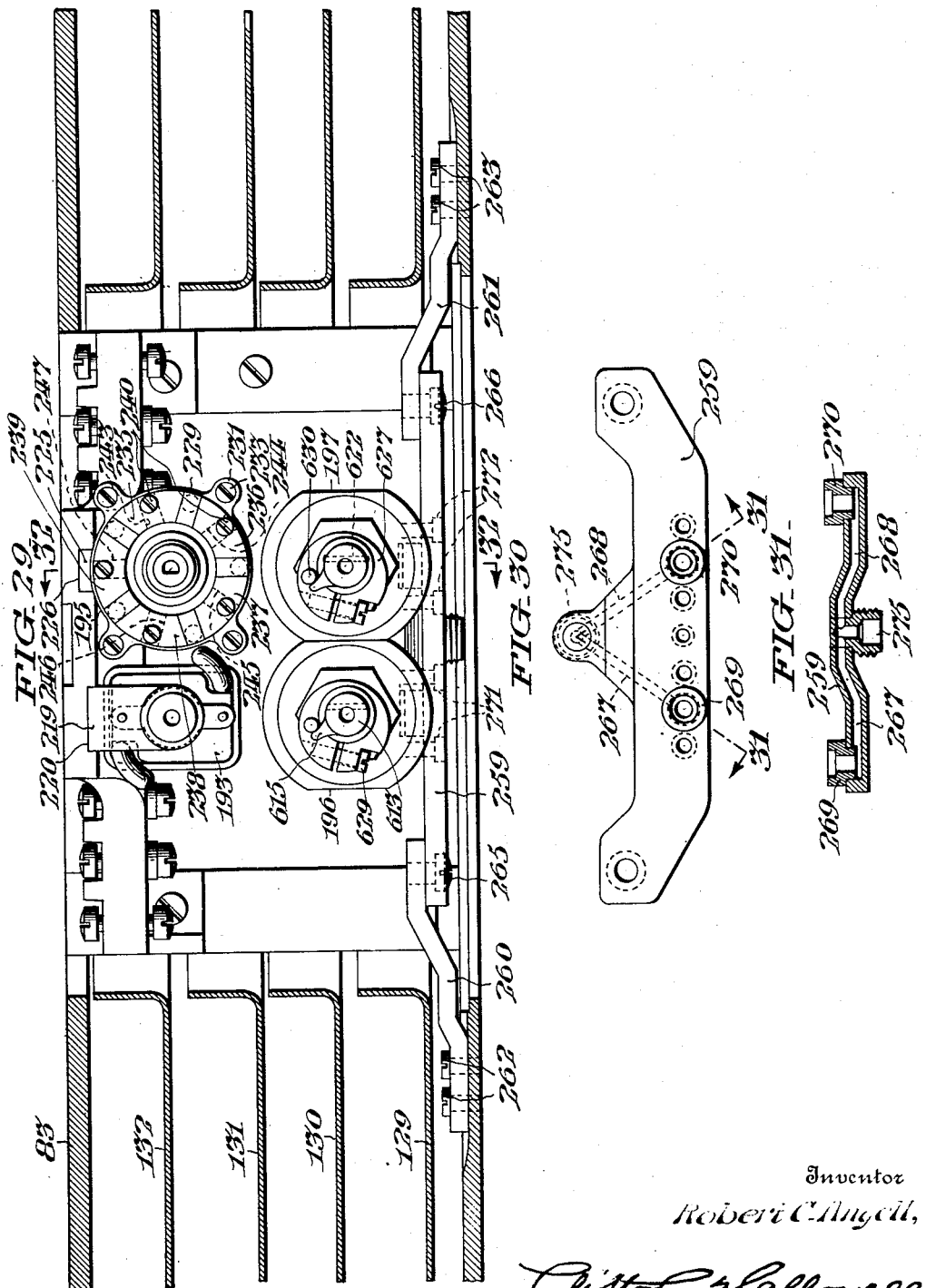

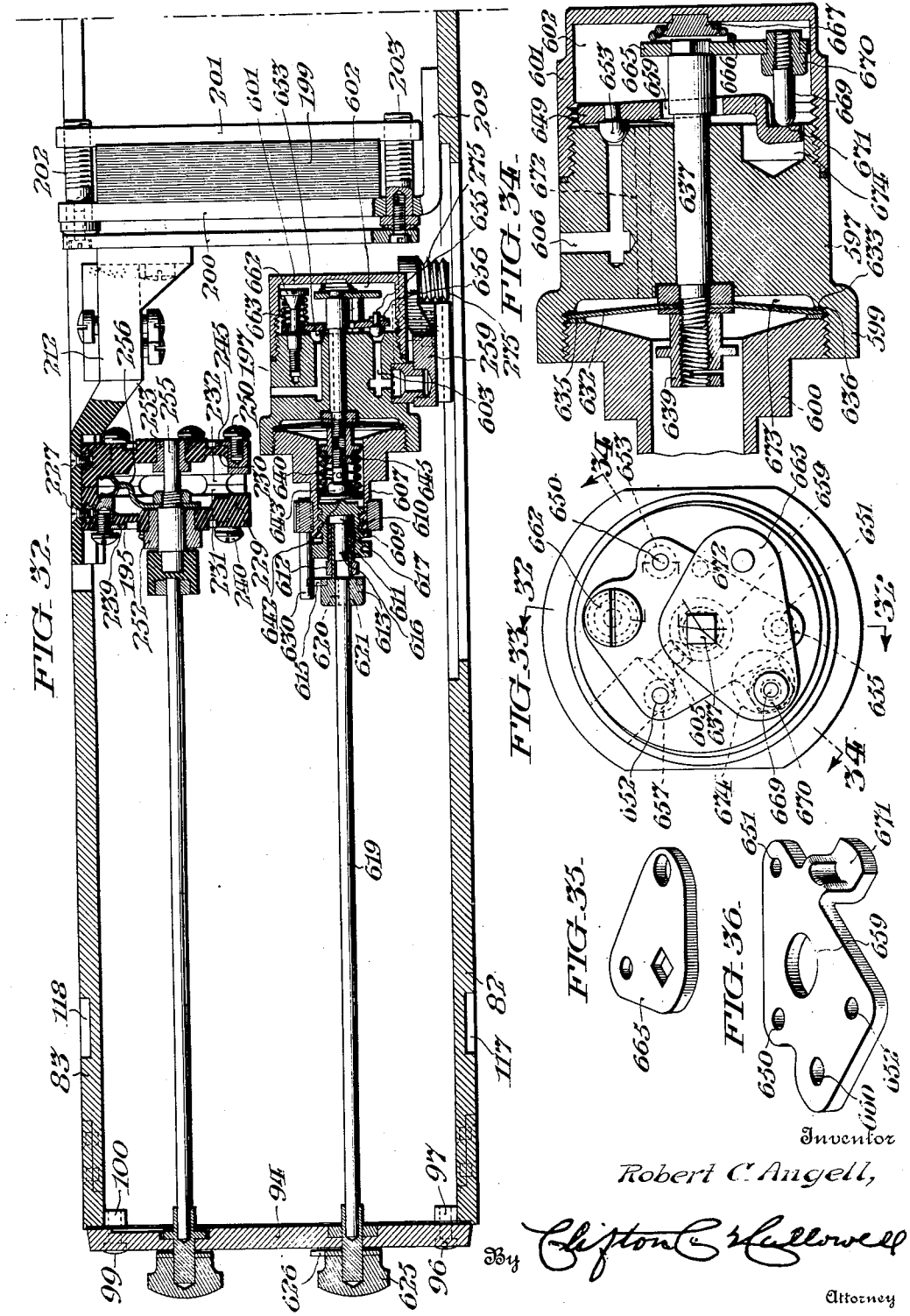

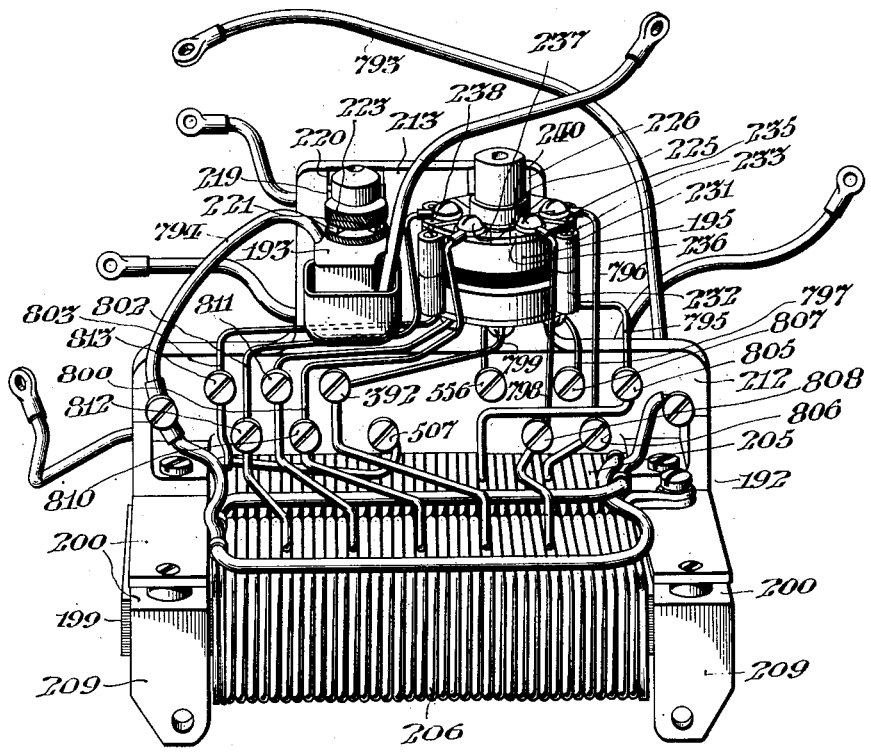
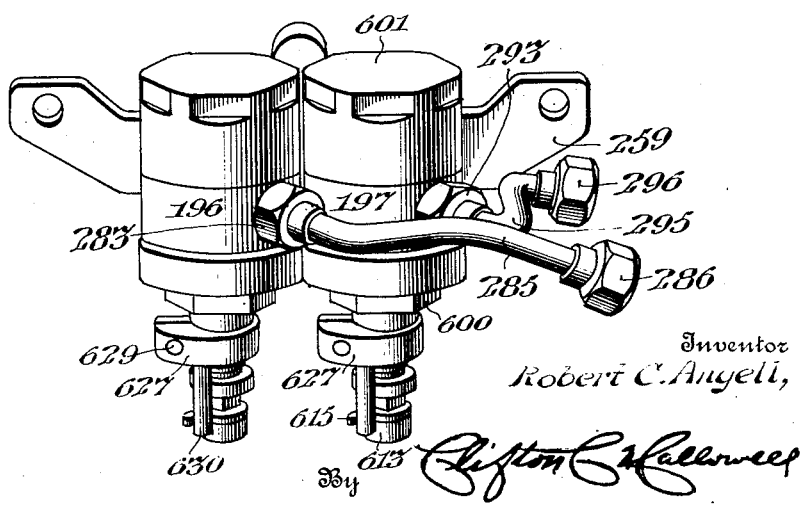

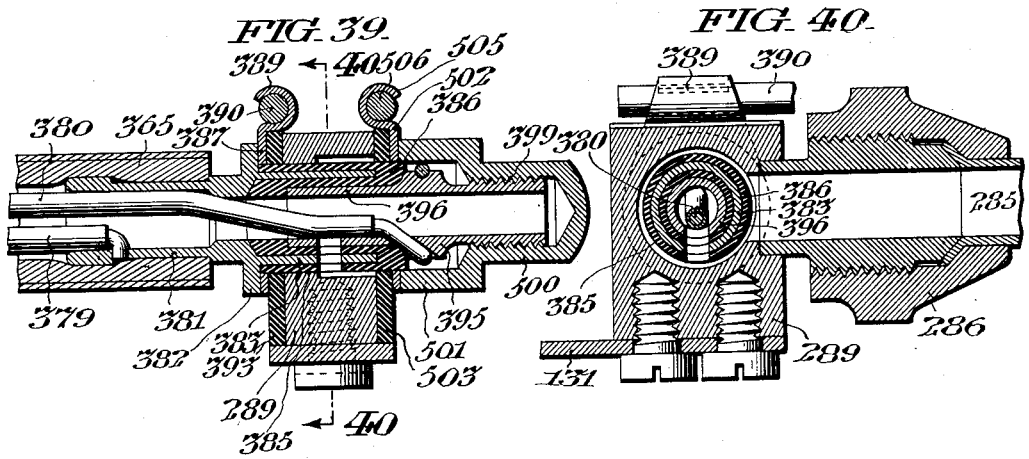

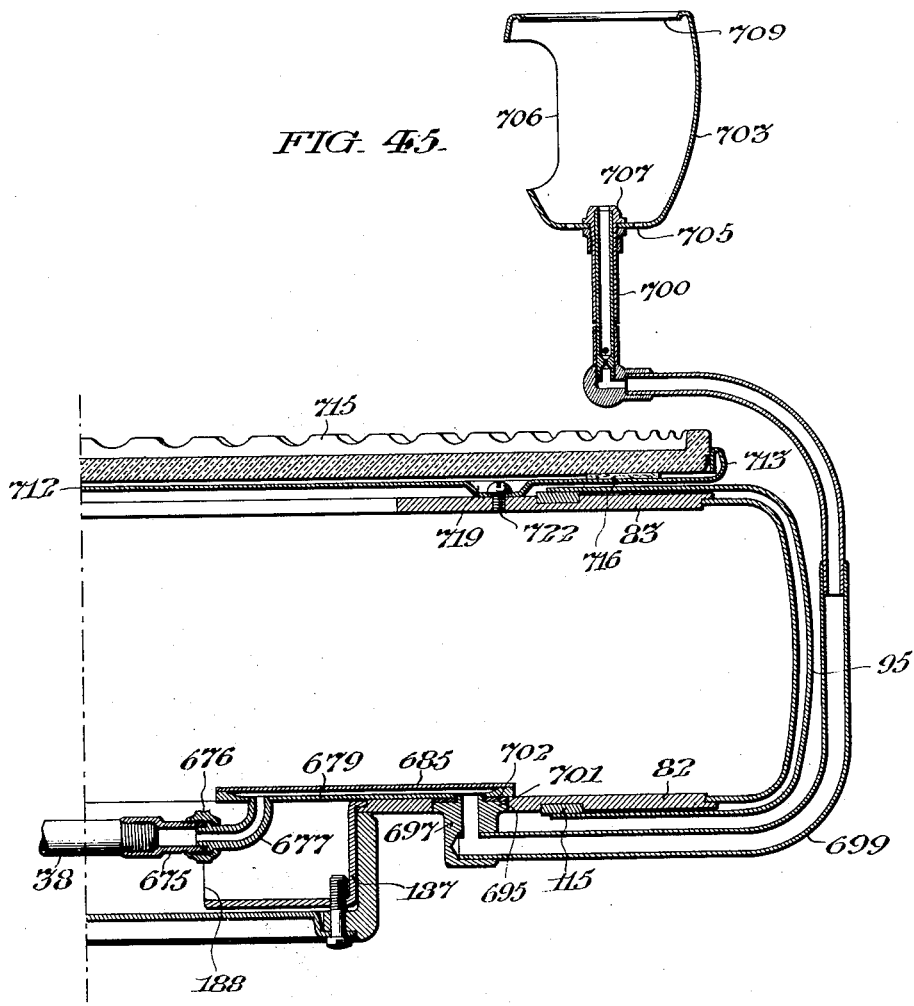
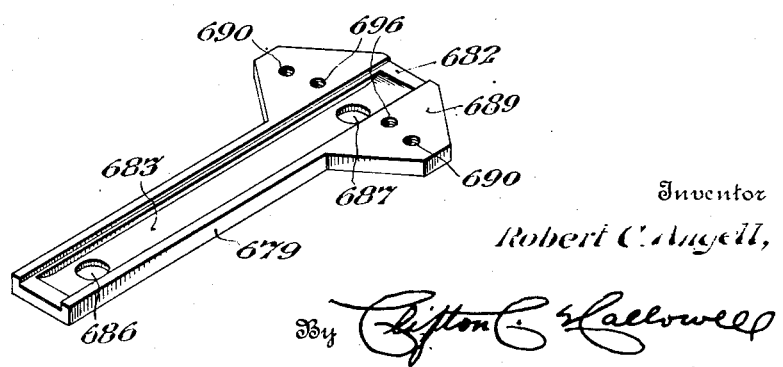

Sept. 4, 1934.  R. C. ANGELL  1,972,072
ACCESSORY TABLE
Filed May 21, 1928   18 Sheets-Sheet 17
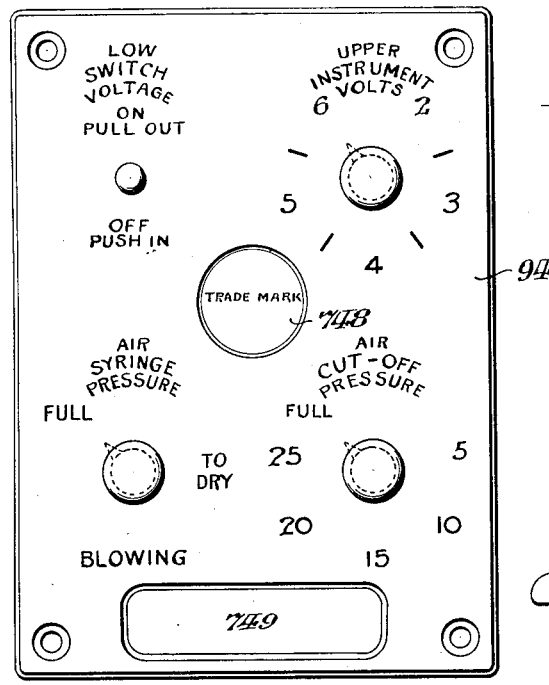
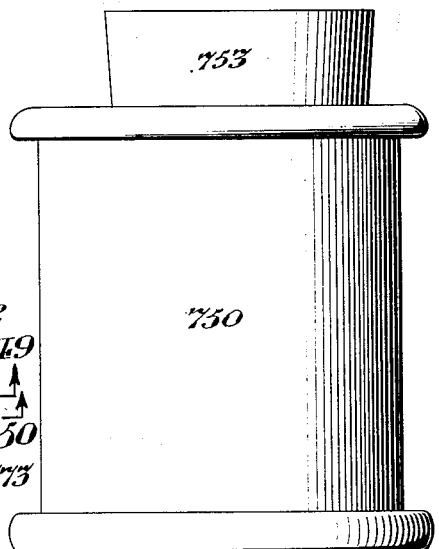
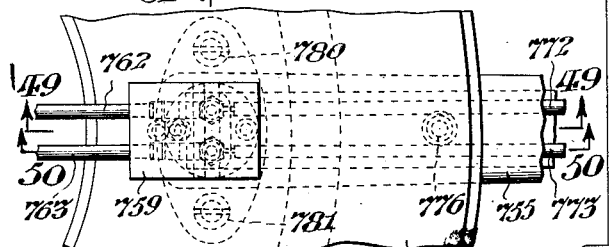
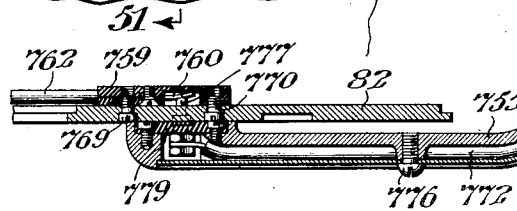
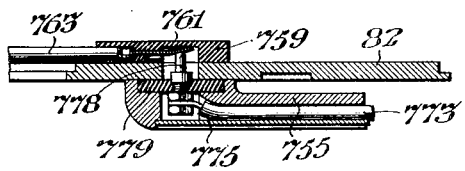
Inventor
Robert C. Angell,
By Clifton G Callwell
Attorney

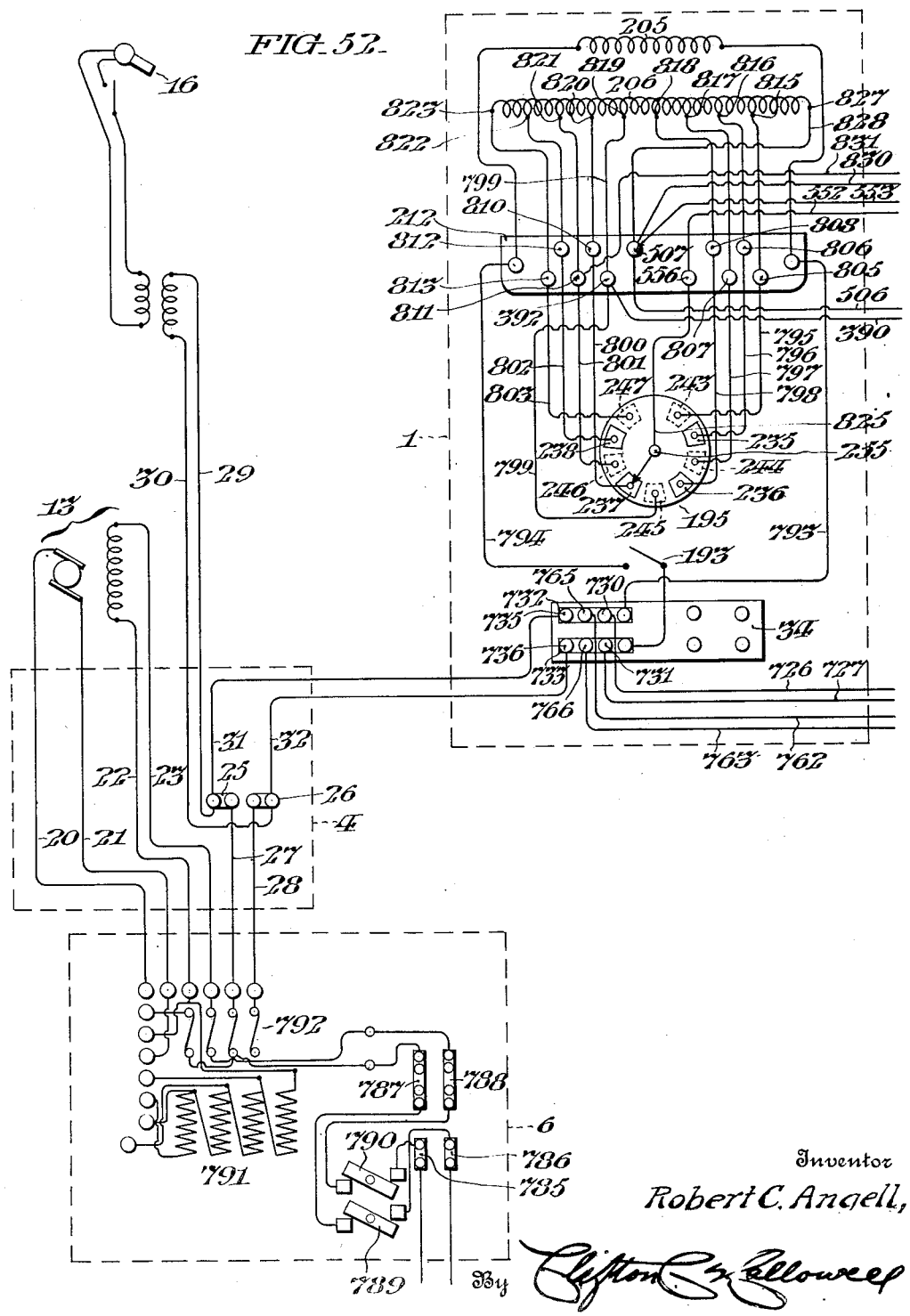

Patented Sept. 4, 1934

1,972,072

UNITED STATES PATENT OFFICE 1,972,072

ACCESSORY TABLE

Robert C. Angell, Prince Bay, N. Y., assignor to The S. S. White Dental Manufacturing Company, a corporation of Pennsylvania Application May 21, 1928, Serial No. 279,546

75 Claims. (Cl. 32—5)

My invention relates particularly to that class of devices in which a plurality of conductor attached instruments for operative purposes are so closely assembled and associated as to be readily available to the operator, and is especially directed to the means which afford the convenient withdrawal and retraction of said instruments with respect thereto.

The principal objects of my invention are to provide an instrument supporting structure upon which a plurality of instruments for operative purposes may be assembled for convenient selection, and so connected by flexible conductors with a source of actuating power as to be normally directed in position for convenient grasp of the operator and to permit freedom of movement into any required operative position without shifting the instrument in the hand of the operator after being grasped.

Other objects of my invention are to provide an instrument supporting structure having rotatable means arranged to carry the instrument connecting conductors so spirally coiled thereon as to prevent short bending, kinking or twisting, and consequent damage or deterioration of said conductors by withdrawal or retractive movement of said instruments.

Further objects of my invention are to provide a compact instrument supporting structure embodying all of the essential elements, and so constructed and arranged as to be readily taken apart and assembled, being formed of separate instrument supporting units superimposed one upon another and compactly encased in a readily removable housing.

My invention further includes an instrument supporting structure comprising a bracket table, from which the instruments and their conductors may be withdrawn in a direction substantially tangential to the periphery of a circle inscribed within the table housing about the axis of the table, whereby the table may be disposed in working position forwardly of the patient and conveniently accessible to the operator, while the conductor carrying the instrument employed may be linearly directed from the table toward the mouth of the patient to be operated upon.

My invention comprehends yielding means serving to separate the coils of the instrument conductors and tending to expand said coils as it retracts the conductors and their instruments from withdrawn position.

My invention comprises means arranged to in effect arrest the conductor in any desired extent of withdrawal, so as to relieve the tension on said withdrawn conductor effected by the yielding retracting means, said conductor arresting means being so constructed that its release may be conveniently effected either by a further withdrawal movement of said conductor or by manually tripping said means.

My invention includes such an arrangement of the conductors connecting the electric transformer and air pressure regulators with the relatively movable instruments, that said transformer and regulators are embraced by the coils of said conductors, which contract and expand thereabout upon the respective withdrawal and retraction of said instruments.

My invention further comprehends such an arrangement of the table structure as to afford ample free surface space both under and above the table casing for attachment of adjunctive or auxiliary devices, and provides such simple means of attachment that said devices may be readily removed as separate units for shipment or for replacement and may be easily reassembled.

Specifically stated, the form of my invention as hereinafter described comprises an accessory equipment supporting device serving as a bracket table, rotatably supported upon a pedestal by an articulated hollow bracket arm, and comprising a base rotatable about its axis on said bracket arm, and arranged to support a plurality of units each having a substantially central opening and carrying an annular tray rotatably mounted thereon in such concentric relation to said opening as to afford a hollow circular well or chamber in which power distributing and controlling mechanisms may be conveniently disposed and connected through said hollow bracket arm with sources of power or energy supply, and with relatively movable instruments for operative purposes by flexible conductors spirally coiled on said trays about said distributing and controlling mechanisms.

My invention also includes all of the various novel features of construction and arrangement as hereinafter more definitely specified.

Figure 11:
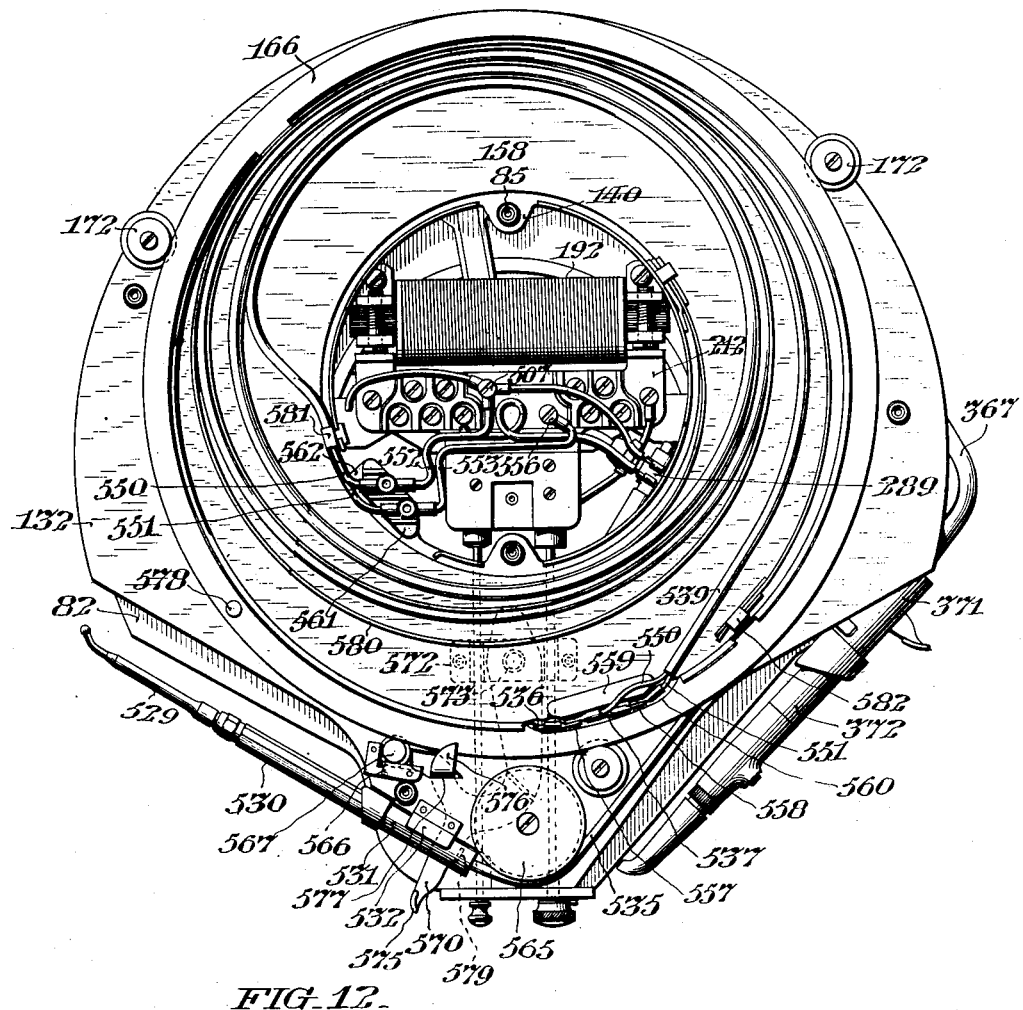
Figure 12:
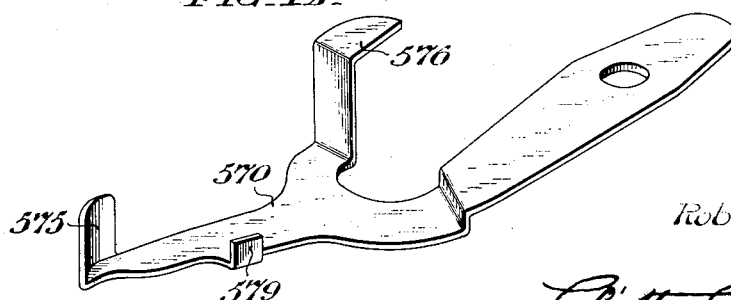
Figure 13:
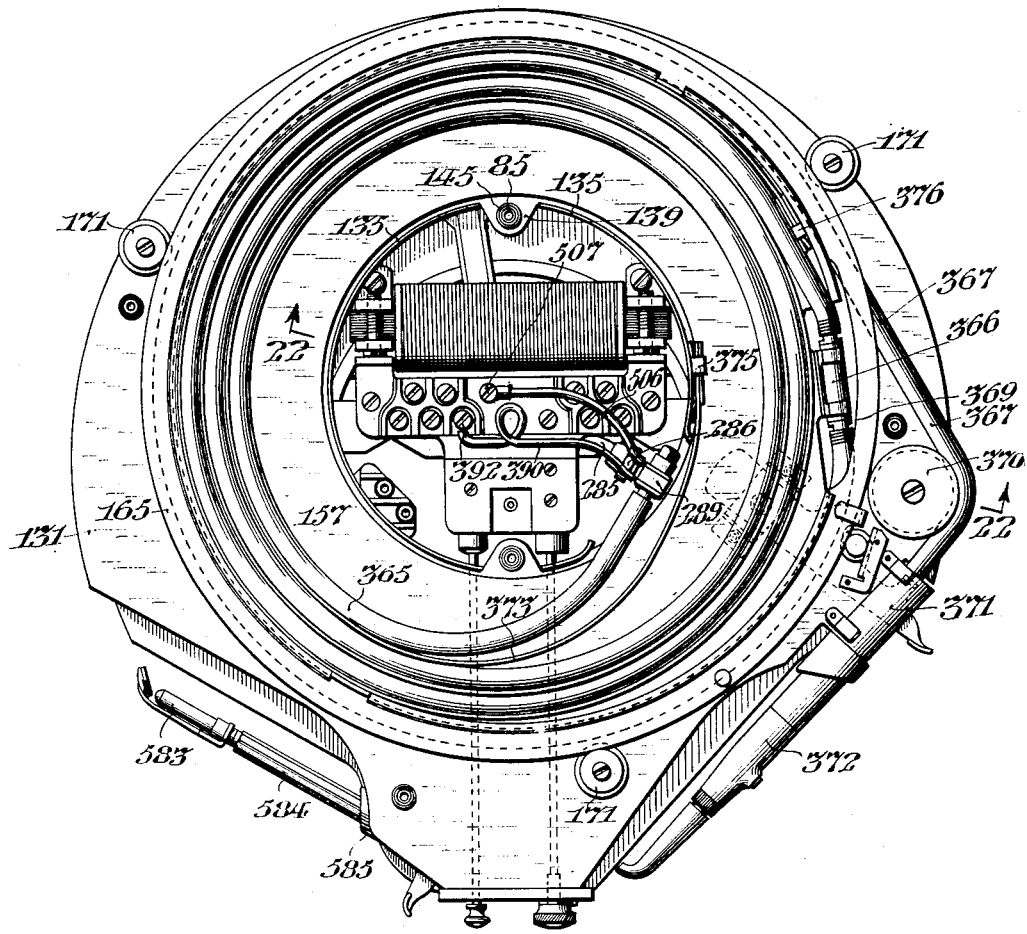
Figure 14:
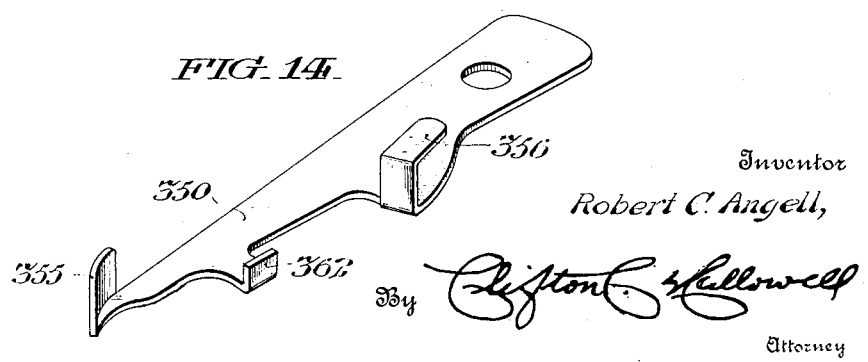

In the accompanying drawings, Figure 1 is a perspective view of a dental equipment stand showing the various devices attached thereto and including the accessory table; Fig. 2 is a central vertical longitudinal sectional view taken through the accessory head of said stand and through the bracket arms upon which the accessory table is mounted to swing into different relative positions; Fig. 3 is a plan view of the main-arm of the bracket which supports the table; Fig. 4 is a plan view of the forearm of said bracket; Fig. 5 is a plan view of the accessory table showing the superposed table-top tray removed and a portion of the closure broken away for convenience of illustration;

Figure 6 is a fragmentary side elevational view of said accessory table showing the signal push-button and the handle on the closure by which said closure may be manipulated; Fig. 7 is a fragmentary plan sectional view taken centrally through the forward right-hand portion of the accessory table and illustrating the closure moved into its open position; Fig. 8 is an inverted plan view of the accessory table with the lateral housing and closure removed for convenience of illustration, but showing the means for attaching the housing thereto; Fig. 9 is a fragmentary sectional perspective view of the pan in which the glass table-top tray is removably supported; Fig. 10 is a sectional elevational view showing the combination buffer stop and plug receptacle for the attachment of high voltage devices;

Figure 11 is a plan view of the table structure with the upper closure plate and lateral housing removed and disclosing the uppermost unit upon which a heated point instrument and its conductor is supported; Fig. 12 is a perspective view of the trip lever for effecting release of the rotary tray of said unit; Fig. 13 is a plan view of the table structure similar to Fig. 11 with the uppermost unit removed and disclosing the third unit from the bottom upon which the warm air syringe and its conductor is supported; Fig. 14 is a perspective view of the trip lever for effecting release of the rotary tray of said unit; Fig. 15 is a plan view of the table structure similar to Fig. 11 with the upper three units removed and disclosing the lowermost unit with the cut-off implement carried thereby drawn out to the limit of its extended movement;

Figure 16 is a fragmentary vertical sectional view taken on the line 16—16 in Fig. 15 through the locking device which retains the tray in locked position when said instrument is withdrawn; Fig. 17 is a perspective view of the wedge-block; Fig. 18 is a perspective view of the roller which cooperates with said wedge-block to retain the tray in its rotated position; Fig. 19 is a central vertical longitudinal sectional view of the accessory table extending in a plane from front to back thereof and showing in elevation the forward end of the bracket upon which it is rotatably supported; Fig. 20 is a vertical transverse sectional view taken through one side of the accessory table on the line 20—20 in Fig. 5 and showing the rollers upon which the trays of the respective units are mounted, the closure being shifted in this view into the plane of section for convenience of illustration;

Figure 21 is a transverse vertical sectional view taken through one side of the accessory table on the line 21—21 in Fig. 5 and including the attaching yoke by which the lateral housing is secured to the upper and lower casing plates of said table, the closure being shifted in this view into the plane of section for convenience of illustration; Fig. 22 is a transverse vertical sectional view taken through one side of the accessory table on the line 22—22 in Fig. 13 in a plane passing through the guiding sheaves and showing the housing structure including the closure; Fig. 23 is an enlarged fragmentary central vertical sectional view of the accessory table in the same plane as the sectional view shown in Fig. 19, but showing the trays relatively rotated to bring into the plane of section certain of the parts carried thereby for convenience of illustration; Fig. 24 is a perspective view of the cover plate with which each of the trays of the respective units is provided to retain the conductor and spring coiled therein; Fig. 25 is a perspective view of the spring clip which is arranged to be attached to the inner peripheral flange of each of the supporting plates of the respective units and with which the inner end of the spring for rotating the trays thereof is engaged;

Figure 26 is a perspective view of the spring clip which is arranged to be attached to each of the outer peripheral margins of the trays of the respective units and to which the outer end of the spring is arranged to be engaged; Fig. 27 is a perspective view of the spring the ends of which are arranged to be engaged with the clips shown in Figs. 25 and 26; Fig. 28 is a vertical longitudinal sectional view of the spring clip shown in Fig. 25 and showing the method of canting the spring to engage its notch therewith; Fig. 29 is a fragmentary central vertical transverse sectional view of the accessory table showing the transformer frame, the control switches and valves in front elevation for convenience of illustration; Fig. 30 is a plan view of the controller valve supporting bar;

Figure 31 is a staggered sectional view of said bar showing the passagesways extending therethrough on the line 31—31 in Fig. 30; Fig. 32 is a vertical longitudinal sectional view taken on the line 32—32 in Fig. 29 in a plane extending axially through the volt controlling switch and controlling valve, the section of the valve being also taken on the line 32—32 in Fig. 33; Fig. 33 is a rear elevational view of the controlling valve shown in Fig. 32, the cap forming the valve chamber being removed for convenience of illustration; Fig. 34 is a central longitudinal sectional view of said controlling valve taken in relatively angular planes from the axis on the line 34—34 in Fig. 33; Fig. 35 is a perspective view of the pusher-plate which is carried by the valve stem and arranged to actuate the valve plate;

Figure 36 is a perspective view of the valve plate; Fig. 37 is a perspective view of the transformer unit including the control switch and the volt regulating switch; Fig. 38 is a perspective view of the air controller valve unit including the valve supporting bar and the two air controlling valves mounted thereon; Fig. 39 is a vertical longitudinal sectional view of the fitting and the parts attached thereto to which is connected the flexible tubing, which terminates at its outer end in the warm air syringe; Fig. 40 is a transverse vertical sectional view of said fitting taken on the line 40—40 in Fig. 39 and showing the air pipe connection leading from the pressure regulator valve;

Figure 41 is a central longitudinal sectional view of the splicer and the parts attached thereto which connects the flexible tubing from the air pressure regulating valve with the flexible tubing extending to the warm air syringe; Fig. 42 is a perspective view of the clip which is arranged to engage said splicer with the tray; Fig. 43 is a perspective view of the terminal clip to which the electric wires are attached which connect the transformer with the fitting shown in Fig. 39; Fig. 44 is a perspective view of one of the nipples included in the splicer shown in Fig. 41, the difference between this splicer nipple and the companion splicer nipple being the relatively connected internal and external threads at their connected ends; Fig. 45 is a transverse vertical sectional view of the accessory table taken on the line 45—45 in Fig. 8 in the longitudinal plane of the gas connection conduit and showing the gas line through the table to the burner which is disposed over the table;

Figure 46 is a perspective view of the body of the gas conduit within the table; Fig. 47 is a front elevational view of the switchboard panel and showing the indicia for indicating the position of the controlling handles to produce desired results; Fig. 48 is a fragmentary plan sectional view of the lower plate of the accessory table and showing the connection with said plate of the spray bottle holder parts; Fig. 49 is a sectional elevational view of the spray bottle holder and its connection with the table taken on the line 49—49 in Fig. 48; Fig. 50 is a fragmentary vertical sectional view of said connection taken on the line 50—50 in Fig. 48; Fig. 51 is a fragmentary transverse vertical sectional view of said connection taken on the line 51—51 in Fig. 48; and Fig. 52 is a wiring diagram showing the wiring connections through the stand, the head and the table.

In said figures the bracket table 1 is conveniently mounted for universal adjustment upon the bracket comprising the relatively jointed forearm 2 and main-arm 3, the latter being swingably supported for horizontal movement upon the hollow distributing head 4, which is carried by the hollow standard 5 curvedly projecting laterally and upwardly from the pedestal body 6 within which the service connections for the water, gas, air and electric current may be made.

The pedestal 6 also conveniently supports the spittoon 7, the frame 8 of which serves to carry the valve body 9 comprising suitable valves for controlling the water supply passing therethrough to the nozzle 10 and into the spittoon 7 and for the saliva ejector 11.

The distributing head 4 also conveniently affords support for the dental engine 12 including its motor 13, and is provided with the lamp bracket 15 upon which the universally mounted lamp 16 is supported, and has the removable closure plates 17 arranged to close the suitably provided oppositely disposed apertures providing convenient access to the air, gas and electrical connections which are housed therein.

As best shown in Fig. 2, the distributing head 4 is provided with an inwardly depending supporting member 18 having an axially disposed bore 19 in which is secured the vertically disposed tubular post 14 extending upwardly through the main-arm 3 and serving as a pintle upon which said main-arm 3 may oscillate, and also providing a conduit through which the electrical connecting wires 20, 21, 22 and 23 may extend to the motor 13 which is supported on said post.

Said supporting member 18 carries the suitably insulated connector plates 25 and 26 to which the leading-in wires 27 and 28 from the service supply are respectively connected. The connector plates 25 and 26 are also connected by wires 29 and 30 extending through the lamp bracket 15 to the lamp 16, and by conductor wires 31 and 32 extending through the bracket arms 3 and 2 to connections with the terminal connecting bar 34 within the bracket table 1 to be hereinafter described.

Disposed within the distributing head 4 is the connector unit 33 comprising suitable inlets 35 and outlets 36 respectively for connection of the gas tubing 37 leading from the service supply and the gas tubing 38 leading through the bracket arms 3 and 2 to the bracket table, and also comprising suitable inlets 39 and outlets 40 respectively for connection of the air tubing 41 leading from the service supply and the air tubing 42 leading through the bracket arms 3 and 2 to the bracket table, the air passage in said connector unit conveniently including the air filter 43 by which moisture entrained in the air passing therethrough may be extracted.

The main-arm 3 rotatably rests upon the bearing seat 45 on the distributing head 4 and is provided with the depending lug 46 in which suitable buffers 47 may be disposed to so engage the stops 49 on the distributing head as to limit the oscillatory movement of said main-arm 3 with respect to the pedestal 6.

Said main-arm 3 terminates in a cylindriform cup 51 somewhat shallower than the main-arm proper, and the peripheral upper edge of said cup affords a bearing seat 52 upon which the forearm 2 of the table bracket is arranged to oscillate, being limited in its oscillatory movement by the laterally disposed stop lugs 53.

The forearm 2 terminates rearwardly in an annulus 55 having its lower edge provided with an inturned flange 56 which slidingly rests upon the bearing seat 52 and is retained thereon by the cylindrical retainer 57 which is provided at its upper edge with the outwardly extended flange 59 overlying the inturned flange 56 on the forearm, and at its lower edge with the inturned flange 60 by which said retainer is adjustably engaged through the medium of the yoke-plate 61, and screw 62 which is freely rotatable in the lower wall of the cup 51 and is in threaded engagement with yoke-plate 61 so that the friction between the flanges 56 and 59, and the bearing seat 52 may be varied as desired, it being understood that sufficient clearance is present between the flange 60 and the bottom of the cup 51, to premit adjustment. The retainer 57 is prevented from rotation in the cup 51 by the pins 58 extending upwardly from the floor of said cup 51 through suitably provided apertures in the flange 60.

It will be obvious that by forming the inner terminal of the forearm annular, an opening is provided which facilitates the threading of the wires and tubing through the tortuous joint between the main-arm 3 and forearm 2, which opening is conveniently closed by the removable and replaceable cap 62 which may be secured in place, to form a closure, by the set screw 63.

As best shown in Fig. 4, the forearm 2 is provided with the buffers 65 which are arranged to engage the respective stop lugs 53 above described to limit the relative oscillatory movement of said forearm 2 with respect to said main-arm 3.

The forearm 2 terminates forwardly in an annulus 66, the upper edge of which affords a bearing seat 67 upon which the accessory table 1 is slidably supported for relative oscillation, and said annulus 66 is provided at its lower edge with the inturned flange 69 which is provided in its under face with the annular recess 70 arranged to receive the peripheral flange 71 of the invertedly dished closure 72, preferably formed of sheet material and secured to the annulus 66 by screws 73 as best shown in Fig. 19.

As shown in Figs. 2 and 4, the inner edge of the flange 69 is provided with the recess 75 which has the undercut extension 76 disposed in the axial plane of the forearm 2, and arranged to receive the downwardly and inwardly extending tail 77 of the electrical conduit 79 which may be preferably formed of sheet material and which is provided with the curvedly formed lug 80 projecting upwardly from its free end into the bore of a short length of cylindrical tubing 81 preferably disposed in concentric relation with the axis of rotation of the accessory table 1 and affording a continuation of the conduit 79 for the electrical conducting wires 31 and 32, and serving as a centering guide about which the gas and air tubings 38 and 42 may be loosely coiled or looped.

The accessory table is a hollow structure in which the instrument controlling mechanisms and the conductor supporting and actuating means are conveniently housed. Said table comprises the lower annular base plate 82 and the upper annular cover plate 83 connected in relatively spaced relation by the connecting posts 85 which are secured to the lower plate 82 and extended upwardly, affording a support upon which the upper plate 83 rests, being detachably secured thereto by the screws 86 in threaded engagement with said posts 85.

Said accessory table is provided with a lateral housing comprising the several housing plates 89, 90, 91, 92 and 93 and the switchboard panel 94, and said lateral housing also includes the slidable closure 95, the housing plates 90 and 91 and the closure 95 being of annular sector formation. Said switchboard panel 94 is disposed at the forward side of the accessory table, or the side facing the operator, and is secured by screws 96 to the upturned lugs 97 on the lower annular plate 82, and by screws 99 to the depending lugs 100 on the upper annular plate 83.

The housing plates 89, 90, 91 and 92 are attached to the annular plates 82 and 83, by a plurality of spring yokes 101 to which they are secured by screws 102, said spring yokes 101 having their opposite end portions curvedly bent inwardly into substantially parallel relation and terminating in rebent angularly disposed hooked lips 103 and 104 extending oppositely and outwardly and respectively arranged to be snapped into suitably disposed apertures 105 and 106, which may be preferably formed by saw-cuts, in the respective annular plates 82 and 83, said apertures being inclined outwardly in conformity with the angular direction of the retaining hooked lips 103 and 104, so that any tendency toward outward displacement of the housing plates will be effective to engage the spring yokes 101 with the annular plates 82 and 83 with increased tenacity.

The forward ends of the housing plates 89 and 93 are overlapped by the lateral margins of the switchboard panel 94, and the screws 96 and 99 which engage said panel 94 with the lower and upper annular plates 82 and 83 respectively, also pass through suitably provided apertures in the end margins of said housing plates 89 and 93, the latter not being itself provided with an attaching spring yoke, has its opposite end offset and overlapped by the forward margin of the housing plate 92 and is thereby retained in position.

The circular continuity of the hollow table structure thus described is interrupted by recesses 109 and 110 disposed upon opposite sides of the switchboard panel 94, and formed by depressions in the housing plates 89 and 93 which have their outer surfaces concaved as shown at 111 and 112 to afford greater depth of recess intermediate of their upper and lower edges, the purpose of said recesses is to provide space in which operative tools or instruments may be disposed when not in use as will be hereinafter described.

The slidable closure 95 which is substantially semi-annular has a cylindriform outer wall curving into plane lower and upper walls 113 and 114 which are relatively parallel and have their inner semicircular free margins respectively engaged with the semicircular slide-strips 115 and 116, the slide-strip 115 being arranged to slide in the circular groove 117 in the under face of the lower annular plate 82, and the slide-strip 116 being arranged to slide in the circular groove 118 in the upper annular plate 83.

Obviously the slide-strip 115 and 116 serve to guide the closure 95 circularly around the body of the accessory table, thus affording ample protection for the switchboard panel 94 and the controlling devices thereon, as well as the implements which may be disposed in the recesses 109 and 110, when in its closed position as shown in Fig. 5, and providing quick and convenient shifting of said closure to the rear of said table structure when access to the switchboard panel or the implements is desired. The sliding movement of the closure 95 is limited by its inturned end flanges 119 and 120 which are respectively arranged to engage the rolled end bead 121 on the housing plate 92 in either the closed or open position of said closure 95.

Said closure 95 is provided with the handle 122 by which it may be conveniently manipulated, and said handle is provided with a latch-plate 123 rockably mounted therein and having its inner end 124 extended through a suitably provided aperture in the cylindriform wall of said closure and arranged to engage the bead 121, and its outer end 125 extended outwardly to afford a thumb-hold by which it may be rocked in opposition to the spring 126 tending to maintain said latch-plate in its operative position to engage said bead and retain said closure locked in its open position.

It may be here noted that when the closure is shifted to its open position as shown in Fig. 7, it is rigidly engaged with the housing by the opposed flange 120 and latch-plate 123 embracing the bead 121, so that the handle 122 may be conveniently utilized by the operator to rotate the table to any position desired.

Within the hollow accessory table structure thus described, a plurality of horizontally disposed annular supporting plates 129, 130, 131 and 132, having the interiorly disposed upwardly directed flanges 133, 134, 135 and 136 respectively and the inwardly extended lugs 137, 138, 139 and 140, are stacked one upon the other.

As best shown in Fig. 23, said plates 129, 130, 131 and 132 are supported in spaced relation by the spacing sleeves 142, 143, 144, 145 and 146 slipped over the respective posts 85, the innermost of which extend through the lugs 137, 138, 139 and 140, and the outermost extend through the peripheral margin of said plates 129, 130, 131 and 132. Said sleeves 142, 143, 144 and 145 may perferably be permanently secured to their respective plates 129, 130, 131 and 132.

The uppermost sleeves 146 are engaged by screw threads with the upwardly projecting threaded hollow shanks 149 of the sleeves 145 and said sleeves 146 are provided with the pockets 150 in their upper ends affording seats for the helical springs 151 which embrace the upper end portions of the respective posts 85 and so bear against the under face of the upper cover plate 83 as to insure maintenance of the supporting plates 129, 130, 131 and 132 in their proper relatively spaced relation.

The supporting plates 129, 130, 131 and 132 respectively support for rotation thereon the annular trays 155, 156, 157 and 158 having upturned peripheral flanges 159, 160, 161 and 162 respectively engaged with the outwardly grooved rims forming pulleys 163, 164, 165 and 166.

Said annular trays 155, 156, 157 and 158 are rotatably carried by the rollers 169, 170, 171 and 172 mounted for rotation on the vertically disposed stud-posts 173, 174, 175 and 176 respectively projecting upwardly from said supporting plates 129, 130, 131 and 132, said rollers being retained on said stud posts by the headed screws 177, 178, 179 and 180 respectively, and being formed with shoulders 181 and 182 and peripheral rims 183 and 184, the shoulders 181 and 182 affording a cylindrical surface upon which the peripheral edges of said annular trays bear in rotation, and the peripheral rims 183 and 184 extend into the grooves of said rims or pulleys to afford rotatable support for said annular trays 155, 156, 157, and 158, there being by preference, three of the rollers 169, 170, 171 and 172 on the respective supporting plates 129, 130, 131 and 132 for rotatably supporting said trays thereon.

The accessory table as a whole is mounted for rotation upon the annulus 66 at the free end of the forearm 2 and has the central opening, the margin 185 of which rests upon the bearing seat 67 and is rabbeted to provide a bearing seat 186. Said accessory table is retained on the forearm 2 by the cylindrical retainer 187 which has the lateral opening 188 and which is provided at its upper edge with the outwardly extended flange 189 overlying the bearing seat 186, and at its lower edge with the inturned flange 190 overlying the flange 69 of the annulus 66 in slightly spaced relation thereto and arranged to be engaged therewith by the screws 73 to effect any desired degree of friction between the said flange 189 and the marginal bearing seat 186, whereby the rotary surface tension of the table upon the bracket arm may be varied.

The annular supporting plates 129, 130, 131 and 132 with their upwardly directed flanges 133, 134, 135 and 136 form a centrally disposed well affording a chamber within which may be located the controlling devices comprising the transformer 192 for reducing the voltage for the low voltage instruments, the control switch 193 for controlling or turning on and off of the electric current to said transformer, the regulating switch 195 by which the low voltage electric current may be varied as desired, the air pressure regulating valve 196 by which air pressure for the warm air syringe, to be hereinafter described, may be controlled, and the air pressure regulating valve 197 by which air pressure for the air cut-off implement, to be hereinafter described, may be controlled.

The transformer 192 embodies the usual transformer elements, comprising the laminated core 199, tightly clamped between the frame bars 200 and 201 by the screws 202 and 203, and having the primary coil 205 and secondary coil 206, the forward frame bars 200 thereof being bent into horizontal position to form supporting feet 209 therefor, which rest upon the lower annular base plate 82 and are secured thereto by the screws 210. For convenience of illustration, the transformer body and all the parts composing the same are shown in elevation in the vertical longitudinal sectional view illustrated in Fig. 19.

The transformer 192 conveniently affords a support for the low voltage connecting plate 212 which provides for the various connections to be hereinafter described. Said connecting plate 212 may be formed of any suitable insulating material such as hard rubber or bakelite composition, and is provided with the upwardly and forwardly disposed extension 213 which is connected by the link 215 with the upper annular cover plate 83, said link 215 being secured to said extension 213 and plate 83 respectively by the screws 216 and 217.

The forward extension 213 of the plate 212 affords a convenient support for the control switch 193 and the low voltage regulating switch 195. Said control switch 193 is disposed beneath said extension and dependingly supported by the angle bracket 219 which has its horizontal arm disposed in the groove or channel 220, being secured therein by the screw 218, and the vertically depending leg bifurcated so that its prongs 221 straddle the stem 222 of said switch and may be clamped thereto by the thumb-nut 223 which may have the knurled periphery as indicated.

Said forward extension 213 also serves to support the regulating switch 195 which has the spline 225 fitted in a suitably provided groove or channel 226 in the under face of said extension and which is secured by the screws 227 extended through said extension from the top thereof and threaded into said spline 225.

The low voltage regulating switch 195 comprises the relatively spaced circular disks 229 and 230 formed of insulating material and having the peripheral lugs 231 and 232 respectively extended to abut in a plane intermediate of said disks and being connected by the screws 233 extended through the lugs 231 and screw threaded into the lugs 232.

The disk 229 is provided with the relatively separated metallic contact sectors 235, 236, 237, 238 and 239, each having a binding screw 240 for attachment of connecting the conductor wires to be hereinafter described.

Similarly the disk 230 is provided with the relatively spaced metallic contact sectors 243, 244, 245, 246 and 247 disposed in staggered relation to the corresponding contact sectors 235, 236, 237, 238 and 239 on the disk 229, each having a binding screw 250 for attaching or connecting the conductor wires to be hereinafter described.

The disks 229 and 230 are provided with the bearing bushings 252 and 253 respectively for the switch spindle 255 which carries the movable contact brush or blade 256 which may be swept around by rotation of said spindle 255 to selectively close the circuit through the various contact sectors of the respective disks 229 and 230 as desired.

The pressure regulating valves 196 and 197 are carried by the connecting bar 259 which is supported across the opening in the annular base plate 82 by the brackets 260 and 261 secured to said plate by screws 262 and 263 respectively and to the connecting bar by the screws 265 and 266.

Said connecting bar 259 is provided with diverging air passageways 267 and 268 terminating at their divergent ends in the upwardly extending nipples 269 and 270 which are respectively fitted into suitably provided sockets in the under sides of the bodies of the valves 196 and 197 and which afford an air-tight connection between the chambers of said valves and said air passageways when the bodies of said valves 196 and 197 are secured to said connecting bar 259 by the screws 271 and 272.

The converging ends of the air passageways 267 and 268 terminate in the threaded nipple 275 which has the inwardly flanged threaded annular nut 276 engaged therewith and arranged to connect the outwardly flanged fitting 277 in airtight relation to said nipple 275, said fitting 277 being provided with the laterally extended slip nipple 279 over which the end of the flexible air tubing 42 leading from the source of air pressure through the bracket arms 2 and 3 may be slipped to supply compressed air into the chambers of the valves 196 and 197.

The connecting bar 259 also provides a convenient support for the conduit tubing 81 which is engaged therewith by the angle bracket 280, the latter being secured to said connecting bar by the screw 281 and to said conduit tubing by the screw 282.

As shown in Figs. 15, 19, and 38, the valve 196 is connected by the detachable coupling 283 with the outlet connecting pipe 285 which in turn is connected by the detachable coupling 286 with the fitting 289 mounted on the annular supporting plate 131 and secured to a suitably provided lug extending inwardly from the innermost edge of said supporting plate.

Similarly, the valve 197 is connected by the detachable coupling 293 with the outlet connecting pipe 295 which in turn is connected by the detachable coupling 296 with the fitting 299 which is mounted on the annular supporting plate 129 and secured to a suitably provided lug extending inwardly from the innermost edge of said supporting plate, as shown in Fig. 15.

To the fitting 299 is connected the inner end of the flexible tubing or hose 300 which is loosely coiled upon the floor of the tray 155, and has its outer end connected with the tubular hose connection or splicer 302. This splicer is removably engaged with the clips 303 of the clip-bar 305 which is secured to the upturned lip 306 formed on the straight edge 307 which is incut diagonally through the flange 159 and floor of the tray 155 to provide an open recess 309 for said hose connection or splicer 302.

The splicer 302 is arranged to connect the flexible tubing 300 with the flexible extension tubing 310 which extends from said splicer 302 through the cutout 312 in the grooved rim or pulley 163 and from the groove thereof it extends tangentially outward, around the sheave 313 on the annular supporting plate 129, and through the instrument holder 315 on said plate 129, and terminates in the handle 316 of the air cut-off 317.

As shown in Fig. 15 of the drawings, the air cut-off valve 317 is extended from the table into a possible operative position, and consequently the tray 155 has been rotated to so wind or tighten the coils thereon that they occupy a closely coiled position toward the center of said tray and closely embrace the flange 133 of the supporting plate 129.

The reverse rotation of the tray 155 and consequent uncoiling of the flexible tubing 300 and retraction of the flexible extension tubing 310 with its instrument comprising the handle 316 and cut-off valve 317, may be best effected by the spring 319, which is preferably laminar, and is extended in substantially parallel relation with the flexible tubing 300 so as to be disposed between the coils thereof, and act directly thereon in its effort tending to expand in exerting torque at the rim to effect reverse rotation of the tray.

In order that the spring 319 may be effective to perform its function, it is connected at its inner end to the flange 133 by the spring-clip 320 which is secured on said flange, and is connected at its outer end to the tray 155 by the tray-spring-clip 322 which is secured to the floor of the tray 155 adjacent to the outer peripheral flange 159 thereof.

As best shown in Fig. 26, the spring-clip 320 is formed of a single stamping of sheet metal folded to form spaced inner and outer walls 325 and 326, respectively and providing a channel 327 arranged to receive the spring 319, the inner wall 325 having the laterally disposed lug 329 extended outwardly from its free edge and folded over the outer wall 326 to lock said spring in said channel. Said inner wall 325 is extended to provide the offset relatively inclined feet 330 and 331 conforming to the outer surface of the flange 133 and affording a convenient means of attachment of said spring-clip thereto. Said outer wall 326 is provided with the deflected extension 332 disposed substantially parallel with the foot 330, and arranged to protect the flexible tubing 300 from engagement with the sharp edges of the spring 319.

As best shown in Fig. 25, the tray-spring-clip 322 is formed of a single stamping folded to form the channel 335 arranged to receive the outer end of the spring 319 between its relatively spaced walls 336 and 337 respectively, the wall 336 having the laterally disposed lug 339 extended from its free edge and folded over the wall 337 to retain or lock said spring, and also having the oppositely extended lateral feet 340 and 341 disposed normal thereto and arranged to be secured to the floor of the tray 155.

The spring 319 is provided near its ends with notches 328 and 338 respectively in its upper edge, which are arranged to be engaged with the lugs 329 and 339 to prevent its longitudinal displacement, and may be engaged and disengaged therewith by canting said spring as shown in Fig. 28.

The instrument holder 315 above referred to is secured to the supporting plate 129 by the brackets 314 and comprises a tubular body having near its rear end an elongated rectangular downwardly disposed aperture 342, and has the enlarged instrument receiving orifice 343 forming a vestibule for the convenient guidance of the handle 316 of the cut-off 317, into the narrower or restricted socket or receptacle 344. The forward end of the holder 315 is inclined with respect to the axis of said holder, and is parallel or substantially coincident with the plane of the outer surface of the recessed housing plate 93, through which it extends.

The clockwise rotation of the tray 155 which is effected by drawing the handle 316 outwardly for operative purposes, is resisted by the tension of the spring 319 which tends at all times to effect its reverse rotation. Said reverse rotation, however, is restricted or arrested to hold said tray stationary in any desired position while the cut-off valve 317 is being used by the operator. This holding of the tray stationary in opposition to the actuation of the spring 319 is effected by cooperation of the locking block 345, which is secured to the annular supporting plate 129, and the trip or brake roller 346 which is interposed between said locking block 345 and the peripheral edge of the tray 155, said locking block being so inclined with respect to the peripheral edge of the tray that said roller wedges or jams between said locking block and the edge of the tray when said tray is reversely rotated by the spring 319.

When the tray 155 is thus locked by the jamming of the brake roller 346, the operator may freely use the cut-off valve 317 without being hampered by any retractive pulling on the flexible tubing 310. When desired, however, the brake roller 346 may be released to permit the spring 319 to effect reverse rotation of the tray 155 and the consequent retraction of the tubing 310 and cut-off valve 317 with its handle 316 into the tool holder 315, by the trip lever 350 which is pivoted in the lever fulcrum plate 352 secured to the under surface of the supporting plate 129.

Said trip lever 350 is free to rock on its pintle 353, and comprises the upturned handle 355 by which it may be manually shifted to engage its upwardly and inwardly extended lug 356 with the brake roller 346, through the aperture 357 provided therefor in the supporting plate 129. Said lug 356 extends inwardly over the peripheral margin of the rim or pulley 163 and is arranged to be engaged by the upwardly projecting stud 360 to effect releasing movement of the trip lever 350 by which the brake roller is shifted from its wedged or jammed position. Obviously, this may be effected by pulling the flexible tubing outwardly to the limit of rotation of the tray 155.

Although the trip lever 350 is free to rock on its pintle 353, it is arranged to be shifted to its normally inoperative position and so maintained by engagement of the rear end of the handle 316 with the lug 362 which is extended upwardly from the back edge of the trip lever 350, through the downwardly disposed aperture 342 in the instrument holder 315.

Thus it will be seen that when it is desired to use the cut-off valve 317, its handle 316 may be grasped by the operator and drawn outwardly to any desired extent without disturbing the trip lever 350, and by a release of the pull on said handle 316 and tubing 310, the brake roller 346, being free from the plate 129, is frictionally rolled by contact with the outer peripheral edge of the rim or pulley 163, into a wedged or jammed position between said edge and the locking block 345, the release of said brake roller 346 being effected by pulling the tubing 310 outwardly to the full limit of rotation of the tray 155, to actuate the trip lever 350 by the stud 360, or said lever may be manually actuated by the operator pressing forwardly on the upturned handle 355 to effect release of said tray 155 at any intermediate position of its rotation and consequent intermediate extension of said tubing 310 and its handle 316.

To the fitting 289 is connected the inner end of the flexible tubing 365 which is loosely coiled upon the floor of the tray 157 and has its outer end connected by the tubular hose connection or splicer 366 with the flexible extension tubing 367 which extends from said splicer through the cut-out 369 in the grooved rim or pulley 165 and from the groove thereof it extends tangentially outward, around the sheave 370 and through the instrument holder 371, both of which are mounted on the annular supporting plate 131, said tubing terminating in the handle of the warm air syringe 372 which may be withdrawn for operative purposes as described above with relation to the cut-off valve 317, and may be similarly retracted by the laminated spring 373 secured at its inner end to the flange 135 by the spring-clip 375, and at its outer end to the tray 157 by the tray-spring-clip 376.

As the warm air syringe 372 embodies an electrical heating element, the flexible tubing has the electrical conductors extending therethrough comprising the conducting wires 377 and 378 leading through the flexible extension 367 and the wires 379 and 380 leading through the flexible tubing 365, which terminate at their inner ends in the fitting 289, the wire 379 being engaged with the nipple 381 to which the flexible tubing 365 is connected and which has the peripheral flange 382 intermediate of its ends, and the cylindrical extension 383 projecting into the bore 385, in the fitting 289, and embraced by the sleeved insulator 386 and by the connecting terminal 387 which extends outwardly between said flange 382 of the nipple 381, and the body of the fitting 289, and is provided with the clip 389 to which is connected the leading-in wire 390 connecting said terminal 387 with the binding screw 392 on the connecting plate 212 of the transformer 192, said connecting terminal 387 being separated from the body of the fitting 289 by the insulation spacer 393.

Said conducting wire 380 is engaged with the tubular terminal 395 which has the cylindrical extension 396 telescoped within the cylindrical extension 383 but electrically separated therefrom by the sleeved insulator 386, the opposite end of said terminal 395 being provided with screw threads 399 with which is engaged the cap-nut 500 having the enlarged bell 501 embracing the wire and terminal connection and arranged to bind to the fitting 289, the connection terminal 502 with the insulation spacer 503 interposed between the body of said fitting 289 and said connection terminal 502 which is provided with the clip 505 to which is connected the leading-in wire 506 connecting said terminal 502 with the binding screw 507 on the connecting upper plate 212 of the transformer 192.

The forward ends of the wires 379 and 380 are connected for breaking connection with the inward ends of the wires 377 and 378 respectively, through the hose connection or splicer 366 which comprises the nipples 509 and 510 for clipped over engagement of the opposed ends of the flexible tubing 365 and 367 respectively, the nipple 509 serving as a terminal to which the wire 379 is attached, and the nipple 510 serving as a terminal to which the wire 377 is attached.

The nipples 509 and 510 are provided with the flanges 512 and 513 respectively, disposed intermediate of their ends and have the cylindrical relatively opposed extensions 515 and 516 respectively, said flanges 512 and 513 being electrically connected by the spacing sleeve 517, which is provided with an insulating jacket 519 having spaced circumferential grooves 520 and 521 formed therein in which the spring clips 303 may be removably engaged.

The wire 380 is connected to the tubular terminal 522 which is engaged within the cylindrical extension 515 of the nipple 509, being insulated therefrom by the insulation sleeve 523, and extended beyond the end of said extension 515 and provided with internal screw threads engaged with external screw threads of the companion terminal 525 to which the wire 378 is connected and which is engaged within the cylindrical extension 516 being insulated therefrom by the insulation sleeve 526.

From the foregoing description, it will be observed that the connection between the flexible tubing 365 and the flexible extension tubing 367 together with the electrical lines therein, may be severed by relatively rotating the nipples 509 and 510 to disengage the screw threads of the respective terminals 522 and 525, similarly the tightening of said threaded connection tends to draw together the flanges 512 and 513 against the ends of the spacing sleeve 517 with the soft metal washers 527 and 528 interposed, which completes the electrical circuit between the wires 377 and 379 and wires 378 and 379, and connects the air tubings in air-tight relation.

In the unit last described, which includes the annular support 131 and the tray 157 and which is the third unit from the bottom of the relatively stacked units, the mechanism for locking and releasing the tray is identical with the locking and releasing mechanism described with respect to the lowermost unit, and therefor its specific description is deemed redundant and unnecessary.

The uppermost unit of the stack, comprising the annular supporting plate 132 and the rotatable tray 158, carries the hot plastic instrument 529, the handle 530 of which is removably supported in the holder 531 secured on the supporting plate 132 by the holder bracket 532.

Said hot plastic instrument 529 is connected by the flexible extension cord 535, including the wires 536 and 537, to the transformer through the coiled flexible cord 539 including the wires 550 and 551, and through the leading-in wires 552 and 553 respectively connected with the binding posts 507 and 556 on the connecting plate 212 of the transformer 192. The inner ends of the wires 536 and 537 are connected to the binding posts 557 and 558 on the terminal block 559, through the opening 560 in the rim 166, with the outer ends of the wires 550 and 551, said terminal block 559 being secured on the tray 158 adjacent to said opening 560, and the inner ends of the wires 550 and 551 are connected on the terminal block 561, which is secured on the inwardly projecting lug 562 on the supporting plate 132, with the outer ends of said leading-in wires 552 and 553 respectively.

In this latter unit, which is the uppermost unit of the stack, the flexible extension cord 535 extends tangentially from the rim 166 of the tray 158 and around the sheave 565 to the instrument handle 530, and said cord 535 is arranged to be arrested in any desired outwardly extended position by the locking block 566 and brake roller 567 which is cooperative with the rim 166 to effect locking of said tray 158.

The release of the tray 158 is arranged to be effected by the trip lever 570 which is pivoted on the lever fulcrum plate 572 and is free to rock on its pintle 573, and comprises the upturned handle 575 by which it may be manually shiften to engage its upwardly and inwardly extended lug 576 with the brake roller 567, through the aperture 577 provided therefor in the supporting plate 132.

Said lug 576 extends inwardly over the peripheral margin of the rim 166 and is arranged to be engaged by the upwardly projecting stud 578 to effect releasing movement of the trip lever 570 by which the brake roller 567 is shifted from its wedged or jammed position.

The trip lever 570 is free to rock on its pintle 573, and is arranged to be shifted to its normally inoperative position and so maintained by engagement of the rear end of the instrument handle 530 with the lug 579 which is extended upwardly from the back edge of the trip lever 570 through a suitably provided aperture in the under side of the holder 531.

The reverse rotation of the tray 158 and consequent uncoiling of the flexible conductor cord 539 and retraction of the flexible extension cord 535 with its instrument 529, and handle 530, is effected by the preferably laminar spiral spring 580 which is interposed between the coils of the conductor cord 539, and which is connected at its inner end with the spring-clip 581 and at its outer end with the tray-spring-clip 582 to effect torque tending to so rotate the tray 158 as to retract the extension cord 535 and the instrument connected therewith in a manner similar to that set forth with respect to the units heretofore described.

The second unit from the bottom of the stack and comprising the supporting plate 130 and tray 156 is similar in detail to the uppermost unit last described and therefore it is deemed unnecessary to include illustration of a separate plan thereof. This unit carries the mouth or antrum lamp 583, the handle 584 of which is engaged in the holder 585 and is connected by the extension conductor cord 586 through the spirally coiled flexible conductor cord 587 with the transformer in a manner such as described above in respect to the instrument 529 and the uppermost unit.

Said extension conductor cord 586 passes from the handle 584 around the sheave 588 to the rim 164, and the coils of the spirally coiled conductor cord 587 has the spiral spring 589 interposed between its coils, effective to tend to rotate the tray 156 in opposition to the withdrawal movement of the lamp 583.

Each of the trays 155, 156, 157 and 158 is provided with the cover plate 590 which, as shown in perspective in Fig. 24, is formed annular and is provided with the offset tongue 591 arranged to be entered into the aperture 592 in the upturned peripheral flanges of the respective trays as shown in Fig. 23. Said cover plate is provided diametrically opposite said tongue with the slide bolt 593 slidably engaged with said cover plate by the straps 594 which are struck up from said plate, and the slide bolt 593 is provided with the spring latch 595 which is struck up from said bolt to engage in abutted relation with the innermost strap 594, to maintain the bolt 593 in operative engagement with the suitably provided aperture 596 in the upturned flanges of the respective trays.

The air pressure regulating valves 196 and 197 are identical, each comprising a valve body 597 having the forwardly extended enlarged internally threaded bell 599 into which the gland 600 is screwed, and having the cap 601 in threaded engagement with the inner end of said body and forming the valve chamber 602 which is provided with the inlet passageway 603, the outlet passageway 605 and the safety vent 606.

The neck 607 of the gland 600 has the forward end of its bore provided with the preferably square screw threads 609 with which the screw threads 610 on the screw plug 611 cooperate when said plug is rotated, to open and close the valve and control the passage of air from the source of supply to the instruments.

Said screw plug 611 has the internally threaded socket into which the tubular adjusting screw plug stop nut 612 is screwed, and into the latter is extended the reduced tubular end of the adjusting screw stop 613 having the stop lug 615.

The tubular end of the adjusting screw stop 613 embraces the cylindrical forwardly projecting stop nut shoe 616, the enlarged head 617 of which is disposed between the end of the adjusting screw stop nut 612 and the inner wall of the socket in the screw plug 611.

Rotation of the parts thus assembled is effected by the valve actuating stem 619 which has the flattened end portion 620 fitted into the bore 621 of the adjusting screw stop 613 and engaged therein by the pin 622, and which extends through the switchboard panel 94 and terminates in the handle or knob 625 having the pointer 626 arranged to be rotated and directed toward the indicia on said switchboard panel indicating the pressure desired.

Mounted on the neck 607 of the gland 600 is the stop pin holder 627 which is split on one side and adjustably clamped thereto by the screw 629, and which carries the stop pin 630 arranged to limit the rotation of the screw plug 611 in its opening and closing movement, and obviously may be adjusted to vary the position of said pin 630.

The gland 600 serves as a valve bonnet and engages the peripheral margin of the diaphragm 632 with the seat 633 in the bell of the valve body 597, between the interposed annular packing washers 635 and 636 to insure an air-tight seal.

Attached to the diaphragm 632 is the valve actuating plunger stem 637, the threaded forward end of which extends therethrough and is engaged therewith by the clamp nut 639, into which is threaded the adjustable extension stud 640, between the outer end of which and the inner point 642 of the screw plug 611 is interposed the spring shoe 643. Said spring shoe 643 affords a seat for the spring 645 which tends to force the diaphragm 632 inwardly and the spring shoe outwardly against the point 642, so as will be readily seen its force may be varied by the axial movement of said screw plug 611 which may be effected by rotation of the handle or knob 625 on the switchboard panel 94.

As illustrated in Fig. 32, the screw plug 611 is indicated in its innermost position to positively effect opening movement of the valve parts, and in this position the diaphragm is maintained inoperative; however, when said screw plug is retracted the spring shoe 643 is forced outwardly by the spring 645 and affords a free space between said spring shoe and the outer end of the stud 640 which permits freedom of dilation of said diaphragm forward and backward, varied by the axial position of said screw plug 611.

Within the chamber 602 is disposed the valve plate 649 which is provided with the triangularly arranged apertures 650, 651 and 652, the aperture 650 being arranged to receive the stem of the semi-spherical safety valve 653 rigidly secured therein, and disposed in position to register with the safety passageway 606, the aperture 651 being arranged to receive the stem of the semi-spherical inlet valve 655 loosely engaged therein and retained by the pin 656, said valve being in position to register with the inlet passageway 603, and the aperture 652 being arranged to receive the stem of the semi-spherical pivot projection 657 similar in form to the valve 653, but arranged to bear against the inner surface of the valve body 597 and affording a pivot upon which the valve plate 649 may rock.

Said valve plate 649 is also provided with the central aperture 659 through which the plunger stem 637 freely extends, and the aperture 660 through which the spring seat screw stud 662 extends as shown in Fig. 32.

As indicated in said figure, the semi-spherical valve 653 is normally forced into its seat to close the safety vent passageway 606 by the spring 663 spirally coiled about the stud 662 between its seat and the valve plate 649.

As best shown in Fig. 34, the inner end of the plunger stem 637 is squared to receive the pusher plate 665 which is secured on said stem 637 and affords a seat for the conically coiled spiral spring 666 which is retained by the headed button 667 in position tending to force the plunger stem 637 and diaphragm forward.

Said pusher plate 665 carries the push-pin 669 adjustably mounted in the bushing 670, and arranged to engage the outwardly stepped seat 671 on the valve plate 649, the valve body 597 being provided with the recess 674 to receive the same and afford ample clearance to permit its free movement.

From the foregoing description it will be obvious that air under pressure from its source of supply is directed through the air tubing 42, air passages 267 or 268, and air inlet passageway 603, passing the inlet valve 655 into the valve chamber 602 and both through the outlet passageway 605 to the instrument and through the passageway 672 into the diaphragm compression chamber 673, so that when there is clearance between the extension stud 640 and the spring shoe 643, the air pressure tends to shift the diaphragm 632 with its plunger 637 together with the pusher plate 665 and its push-pin 669 forwardly.

The forward movement of said push-pin 665 forces the valve plate 649 to rock upon the semi-spherical valve 653 and semi-spherical projection 657, in opposition to the pressure of the spring 663 until the inlet valve 655 closes the inlet passageway 603.

Should there be a leak of air passing the valve 655 into the valve chamber 602, the built-up pressure therein will effect further forward movement of the diaphragm 632 and the parts connected therewith so that the valve plate will consequently be further rocked upon the inlet valve 651 and projection 657 until the safety valve 653 is raised from its seat to relieve the excess pressure in the valve chamber 602 through the safety vent passageway 606.

As shown in Figs. 19 and 45, the gas tubing 38 leading through the bracket arms 3 and 2 enters the chamber formed by the cylindrical retainer 187 through the opening 188 and is loosely coiled or looped around the centering guide 81 and terminates in a threaded nipple 675 connected by the nut 676 with the flanged end of the elbow 677 depending from the gas conduit 679.

Said gas conduit 679, as best shown in Fig. 46, is provided with the channel 682 extending throughout its length, and the countersunk channel 683 terminating short of its ends and of less width than the channel 682 so that when the cover plate 685 is secured in the channel 682 the countersunk channel 683 affords a passageway for the gas which enters through the inlet 686 and passes out through the outlet 687.

As shown in Fig. 46, the outer end of said conduit 679 is enlarged laterally to provide the head 689 having the screw tapped apertures 690 by means of which it is engaged with the base plate 82 by the screws 692, see Fig. 8, extended through suitably provided apertures in said plate and threaded into said tapped apertures 690.

As shown in Figs. 8 and 45, the base plate 82 is provided with the aperture 695 concentric to the outlet 687, and of sufficient diameter to embrace the screw holes 696 in the head 689 with which screws may be engaged to attach the terminal connector 697 of the tubular bracket 699 which extends outward upwardly and inwardly to embrace the table structure and support the Bunsen burner 700 over said table convenient to the operator.

As shown in Fig. 45, the terminal connector 697 has the circular flange 701 disposed in and conforming to the aperture 695, and which affords convenient means of attachment of said terminal connector 697 with the conduit 679 with the interposed gasket 702.

The Bunsen burner 700 is of usual construction but is provided with a shield 703 of novel construction which comprises a shell of truncated ovate formation, having its smaller end disposed downwardly, and the converging side walls curvedly merging into a horizontally disposed end wall having perforations 705 affording air vents, and said shell is provided with the lateral opening 706 affording access to the flame emitted from the burner tip 707, and conforming generally to the sectional contour of said shell which has its upper edge 709 inwardly and downwardly rolled.

It may be here noted that by thus forming the shield, the air currents therein are so neutralized or compensated that the flame is maintained directed in axial alinement with the burner without tendency to deflection.

As shown in Figs. 19 and 45, the opening in the upper plate 83 of the table structure, which affords access to the internal mechanisms of said table, is arranged to be closed by the circular pan 712 which has its peripheral edge 713 rolled inwardly and which provides a holder upon which the service tray 715, preferably formed of glass, may be removably supported, there being provided upon the floor of said pan cushioning pads 716 upon which said tray may rest.

Said pan 712 is provided with an annular channel 719 depressed in its floor and affording an annular bearing resting upon the plate 83 of the table so that the floor of said pan is maintained spaced from the upper surface of said plate, which not only provides clearance for the movement of the closure 95, and for attachment of any auxiliary devices such as the bracket 720 of the instrument holder 721 shown in Fig. 1, but said channel also affords ample space for the heads of the pan attaching screws 722 which project upwardly from said plate 83 and are engaged with suitably provided bayonet slots 723 in bottom wall of channel 719 as shown in Fig. 9, it being obvious that said pan may be detachably engaged with said screws 722 by registering the bayonet slots 723 with the heads of the screws and with the pan resting upon the plate 83, slightly effecting rotation of said pan until the shanks of the screws enter the restricted portion of said slots.

As shown in Figs. 5 and 6, the housing plate 90 is provided with a push-button 724 that may be connected with any form of call signal.

As shown in Figs. 8 and 10, the plug receptacle 725 depends from the base plate 82 and affords attachment for any auxiliary devices employing line voltage, said plug having its connecting wires 726 and 727 leading through a suitably provided aperture 729 in the base plate 82, to the terminal binding screws 730 and 731 on the terminal connecting block 34, which are connected through the terminal plates 732 and 733 and binding screws 735 and 736 with the conductor wires 31 and 32 leading from the source of electric energy. Said plug receptacle 725 also serves as a stop for limiting the rotary movement of the table, and is provided with the resilient buffers 737 which are arranged to engage the stops 739 on the annulus 66.

The switchboard panel 94, which is shown enlarged in Fig. 47, includes indicia indicating the relative positions of the various controlling knobs or handles with respect to the devices with which they are connected and also includes space 748 for the trade-mark and space 749 for the nameplate of the manufacturer.

The spray bottle warmer 750 which is disposed at the side of the table, as indicated in Fig. 1, and which includes the spray bottles 751 and 752 and the tumbler 753, is illustrated in the enlarged views shown in Figs. 48, 49, 50 and 51. The body of the spray bottle warmer and its hollow bracket 755 form a separate unit which may be readily attached to and removed from the table.

The base plate 82 is provided with the twin apertures 756 and 757, over which is disposed the terminal block 759 formed of insulating material and including the spring terminals 760 and 761, which are connected by the wires 762 and 763 respectively with the terminal screws 765 and 766 on the plates 732 and 733 which are connected with the source of electric energy through the wires 31 and 32, said terminal block 759 being permanently secured to the base plate 82 by the screws 769 and 770.

The bracket 755 is provided with the channel 771 in its under side affording a conduit for the wires 772 and 773, which may be closed by the cover plate 775 secured to said bracket by the cover plate retaining screw 776. Said wires 772 and 773 terminate at their inner ends in the contact posts 777 and 778 which are secured in the plate 779 of insulating material disposed in a suitably provided recess in the upper surface of the inner end of said bracket 775.

The contact posts 777 and 778 are so spaced in said plate 779 that their respective points project through the apertures 756 and 757 and engage the spring contacts 759 and 760 respectively, when said bracket 775 is engaged with the base plate 82 by the screw 780 and 781 extended through the wings of said bracket, as best shown in Fig. 51.

Referring to the wiring diagram shown in Fig. 52, the pedestal 6 houses the terminal plates 785 and 786 and the terminal plates 787 and 788 with the interposed switches 789 and 790, and includes the necessary resistances 791 and fuses 792, and the terminal posts to which the wires 20, 21, 22 and 23 leading to the motor 13, and the wires 27 and 28 leading to the connector plates 25 and 26 in the hollow distributing head 4 are connected.

Said plates 25 and 26 are connected by the wires 31 and 32 with the binding screws 735 and 736 on the distributing terminal plates 732 and 733 on the lower connecting block 34, which are connected by the wires 793 and 794 with the terminals of the primary coil 205 of the transformer 192 through which the secondary coil 206 is energized by induction.

The contact sectors 243, 235, 244, 236, 245, 237, 246, 238 and 247 of the regulating switch 195 are respectively connected by the wires 795, 796, 797, 798, 799, 800, 801, 802 and 803 through the binding screws 805, 806, 807, 808, 392, 810, 811, 812, and 813 on the connecting plate 212, with the tops 815, 816, 817, 818, 819, 820, 821, 822 and 823 on the secondary coil 206, the center spindle 255 of said switch is connected by the wire 825 with the binding screw 556 on the connecting plate 212, and the end tap 827 of said secondary coil 206 is connected by the wire 828 with the binding screw 507 on said connecting plate 212.

The hot plastic instrument 529 is connected by the wires 552 and 553 with the binding screws 826 and 507 and with the switch in the position shown in Fig. 52; the circuit includes the wire 552, binding screw 556, wire 825, spindle 255, contact brush 256, wire 800, tap 820, secondary coil 206, tap 827, wire 828, binding screw 507 and wire 553, it being understood, however, that the voltage may be varied by shifting the contact brush 256 of the regulating switch 195 into contact with other contact plates of said switch.

The mouth lamp is connected by the wires 830 and 831, with the binding screws 811 and 507, and the circuit includes the wire 831, binding screw 811, wire 801, tap 821, secondary coil 206 of the transformer, tap 827, wire 828, binding screw 507 and wire 830.

The circuit of the warm air syringe includes the wires 377, 379 and 390, binding post or screw 392, wire 799, tap 819, secondary coil 206, tap 827, wire 828, binding post or screw 507 and wires 506, 380 and 378.

It is to be understood that where in the specification or the claims the spirally coiled conductor or spiral spring is referred to, the words "spiral" or "spirally" are to be construed in the more modern interpretation and refers to a spiral in which the successive coils increase in diameter from the center outwardly, or in other words, the convolutions are extended one about the other substantially in the form of a parabolic spiral and may either be in a plane or disposed on a conical surface.

It may be here noted that the flexible tubing 300, the flexible tubing 365, the flexible cord 539 and the flexible cord 587 are floatingly supported upon the plane floor of their respective trays between the inner and outer terminal connections, and are free to float about said floor in a gyratory manner.

My invention is advantageous in that the instruments or tools are supported in the table structure in such position that the operator may conveniently grasp any one of them in the working position that it is to be used, without further adjustment of said instrument or tool in the hand from the position as thus initially grasped.

Furthermore, by the construction contemplated all of the essential elements are included within the housing of the table structure whereby concentrated control of all of the power or energy supply to the tools or instruments is afforded, and by such construction the number of conductors leading through the necessarily tortuous passageway in the articulated bracket arm is reduced to a minimum.

It may also be observed that both the top and bottom plates of the table afford ample space between the central opening therein and the annular groove, for the attachment of units comprising various auxiliary or supplemental devices.

I do not desire to limit my invention to the precise details of construction and arrangement as herein set forth, as it is obvious that various modifications may be made therein without departing from the essential features of my invention as defined in the appended claims.

Having thus described my invention, I claim:

1. An accessory supporting device, comprising a carrier upon which a conductor may be spirally coiled to connect for relative movement an instrument with a source of actuating power, and yielding means tending to effect rotation of said carrier and consequent expansion of the coils of said spirally coiled conductor and to thereby retract said instrument.

2. An accessory supporting device, comprising a carrier upon which a conductor may be spirally coiled to connect for relative movement an instrument with a source of actuating power, and a spiral spring interposed between the coils of said conductor arranged to retract said instrument and tending to expand the coils of said spirally coiled conductor.

3. An accessory supporting device, comprising a rotatable carrier having a peripheral flange within which a conductor arranged to connect an instrument with a source of actuating power is spirally coiled and extended exterior to said flange and so wrapped thereabout as to be drawn tangentially therefrom with said instrument, and means tending to expand the coils.

4. An accessory supporting device, comprising a base, power controlling devices including a transformer supported on said base, a plurality of spaced annular supports superimposed one upon another on said base and embracing said power controlling devices and transformer and respectively supporting rotary carriers each carrying a conductor coiled thereon respectively connecting for relative movement instruments for operative purposes with the transformer and power controlling devices.

5. An accessory unit comprising a support, a carrier rotatably mounted on said support, a flexible conductor spirally coiled with respect to said carrier arranged to connect a relatively movable tool at its outer end with a stationary source of power supply within the coil of said conductor at its inner end, and being secured intermediate of its ends to the rotary carrier, and a spring spirally coiled in interposed relation with the coils of said conductor tending to expand said coils.

6. An accessory unit comprising a support, a source of energy including power modifying means carried thereby, a carrier mounted to rotate relative to said support and having peripherally disposed means about which a flexible conductor may be wrapped and a flexible conductor coiled with respect to said carrier within and without said means and connecting an operative tool at its free outer end with said source of energy including power modifying means inwardly disposed with respect to the coils and attached intermediate of its ends to said carrier outwardly with respect to the coils within said means.

7. An accessory unit comprising a support, a carrier rotatably mounted to rotate relative to said support and having peripherally disposed means about which a flexible conductor may be wrapped and withdrawn, and a flexible conductor spirally coiled with respect to said carrier within said means and extended and wrapped in concentric relation about said means throughout its withdrawing length, said flexible conductor being connected with a source of energy in stationary relation to said support and being attached intermediate of its ends to said carrier and having an operative tool at its free outer end that may be drawn out for operative use and retracted, and a spring separating the coils and having its ends respectively connected with said support and carrier, effective to retract said tool.

8. An accessory unit comprising a support, a tool holder mounted on said support, an operative tool normally engaged in said holder and arranged to be withdrawn therefrom for operative use, a carrier having a grooved periphery rotatably mounted on said support, a flexible conductor coiled upon said carrier within and without said grooved periphery and engaged at one end with said support and at the other end with said tool, and a spring extending between the coils of said flexible conductor and having its opposite ends respectively secured to said support and to said carrier, tending to retract said conductor and its tool.

9. An accessory unit comprising a support having a central opening, a tool holder mounted on said support arranged to receive an operative tool removably supported thereby, means disposed within said opening arranged to control power from a source of power supply, an annular carrier having a rim rotatably mounted on said support and embracing said controlling means, a flexible conductor spirally coiled upon said annular carrier within and extended without and around said rim and arranged to so connect said power controlling means with said tool that the tool may be relatively moved for operative purposes, and yielding means extending between the coils of said flexible conductor and tending to rotate said carrier and thereby draw said tool toward its holder.

10. An accessory unit comprising a support having a central opening, a tool holder mounted on said support, an operative tool normally supported by said holder for convenient removal, means disposed within said opening arranged to distribute power from a source of power supply, an annular carrier having outwardly disposed guiding means rotatably mounted on said support and embracing said distributing means, and a flexible conductor spirally coiled upon said annular carrier within and extended without and around said guiding means and arranged to so connect said power distributing means with said tool that the tool may be relatively moved for operative purposes.

11. An accessory unit comprising a support having a central opening, a tool holder mounted on said support arranged to receive an operative tool normally engaged therein, means disposed within said opening arranged to control power from a source of power supply, an annular carrier having a grooved rim rotatably mounted on said support and embracing said controlling means, a flexible conductor coiled upon said annular carrier within and without said grooved rim and arranged to so connect said power controlling means with said tool that the tool may be relatively moved for operative purposes, said flexible conductor being secured to said carrier between the portion which extends within the rim and the portion which extends without said rim, and a separable connector joining the inner and outer portion of said conductor together.

12. An accessory unit comprising a support having a central opening, a tool holder mounted on said support, an operative tool normally engaged in said holder, means disposed within said opening arranged to control power from a source of power supply, an annular carrier having a rim rotatably mounted on said support and embracing said controlling means, a flexible conductor coiled upon said annular carrier within and without said rim and arranged to so connect said power controlling means with said tool, that the tool may be removed and manipulated for operative purposes, and a spring disposed between the coils of said flexible conductor and connected at its inner end with said support and connected at its outer end with said carrier, tending to rotate said carrier to retract said flexible conductor and to thereby draw said tool toward its holder.

13. An accessory unit comprising a support, a carrier rotatably mounted on said support, a flexible conductor spirally coiled with respect to said support and removably engaged intermediate of its ends with said carrier and extending oppositely therefrom inwardly to a source of power supply and outwardly to a tool which is free to be moved into different operative positions, and a spring tending to rotate said carrier, connected with said support at one end and to said carrier at the other end and spirally coiled between the respective convolutions of the spirally coiled conductor.

14. An accessory table comprising a casing including a control panel and having depressions in its lateral wall adjacent to said control panel, a plurality of units removaby supported one upon the other in said casing, each comprising a tray rotatably mounted thereon, controlling devices within said casing connected to be controlled through said control panel, a flexible conductor carried by each of said trays and terminating in instruments normally disposed in said depressions when not in use and having their inner ends connected to the respective controlling devices, whereby said instruments may be withdrawn from said casing and retracted thereto.

15. An accessory table comprising a casing including a control panel and having depressions in its lateral wall upon opposite sides of said control panel, a plurality of units removably supported one upon the other in said casing, each comprising a tray rotatably mounted thereon, controlling devices within said casing, means on said control panel arranged to actuate said controlling devices, flexible conductors respectively connected with said controlling devices each being spirally coiled upon one of said rotatable trays and terminating in instruments respectively disposed in said depressions and arranged to be withdrawn therefrom in a direction substantially tangential to the coils of said flexible conductors.

16. An accessory table comprising a casing having relatively spaced depressions in its lateral wall and including a control panel disposed between said depressions, a plurality of units removably supported one upon the other in said casing each comprising a support having a substantially central aperture and collectively affording an open well or chamber, and an annular tray rotatably mounted on each of said supports, controlling devices disposed in said well or chamber, means on said control panel arranged to actuate said controlling devices, a flexible conductor spirally coiled upon each of said trays and having their inner ends respectively connected to said controlling devices and terminating at their outer ends in instruments extended through said casing and disposed in the respective depressions and arranged to be withdrawn therefrom in a direction substantially tangent to the outermost coil on said tray, and a spring interposed between the coils of said flexible conductor and having one end attached to said support and the other end attached to said tray tending to rotate said tray and to effect retraction of the instrument and conductor when withdrawn.

17. An accessory table comprising a casing having a depression in its lateral wall, a removable closure arranged to cover said depression, a plurality of units removably supported one upon the other in said casing each comprising a tray rotatably mounted thereon, a splicer removably attached to said tray near the periphery thereof, controlling devices within said casing, a flexible conductor connecting said controlling devices with the respective splicers, a flexible conductor connected with said splicers and terminating in instruments extended through the wall of said casing and disposed in said depression arranged to be withdrawn therefrom and retracted thereto by rotation of its respective tray, and means tending to rotate said tray to effect said retraction.

18. An accessory table comprising a casing, a plurality of units disposed in said casing and mounted one upon the other, each unit comprising a rotatable tray, a splicer mounted upon each of said trays, controlling devices within said casing, a flexible conductor respectively connecting said controlling devices with the splicers on said trays, and flexible conductors connected with said splicers and terminating in instruments extended through suitably provided openings in the wall of said casing and arranged to be withdrawn therefrom and retracted thereto.

19. An accessory table comprising a casing having a recess in its lateral wall and having apertures leading into said recess, a closure slidably mounted on said casing arranged to cover said recess, a plurality of units disposed in said casing stacked one upon the other and relatively removable therefrom, each having a central opening collectively forming a well or chamber, an annular tray rotatably mounted on each of said units embracing said well or chamber, controlling devices disposed in said well or chamber, a splicer detachably mounted on each of said trays, a flexible conductor connecting said controlling devices with the respective splicers, a flexible conductor connected with said splicer and terminating in an instrument extending through said aperture and disposed in said recess, said instrument being arranged to be withdrawn from said recess to rotate said tray, and means tending to oppositely rotate said tray to effect retraction of said instrument into said depression.

20. An accessory table comprising a casing, power dispensing devices disposed in said casing, and including electrical terminals and air connection, a tubular flexible conductor attached to said air connection and terminating at its free end in a tool arranged to be withdrawn and retracted with respect to said table, a splicer included in said flexible conductor, whereby portions of said conductor may be relatively separated, and comprising oppositely directed tubular nipples each having relatively opposed tubular extensions insulated from said nipples and arranged to be relatively engaged in separable threaded relation, a sleeve electrically connecting said nipples and embracing said extensions but spaced therefrom, electrical conductors extended through said tubular conductor and respectively connecting the innermost nipple and its extension from within the bore thereof with said electrical terminals, and electrical conductors extended through said tubular conductor and respectively connecting the outermost nipple and its extension from within the bore thereof with said tool.

21. An accessory table comprising a casing, power dispensing devices disposed in said casing, and including electrical terminals and air connection, a tubular flexible conductor attached to said air connection and terminating at its free end in a tool arranged to be withdrawn and retracted with respect to said table, a splicer included in said flexible conductor, whereby portions of said conductor may be relatively separated, and comprising oppositely directed tubular nipples each having relatively opposed tubular extensions insulated from said nipples and arranged to be relatively engaged in separable threaded relation, a sleeve electrically connecting said nipples and embracing said extensions but spaced therefrom, electrical conductors extended through said tubular conductor and respectively connecting the innermost nipple and its extension from within the bore thereof with said electrical terminals, electrical conductors extended through said tubular conductor and respectively connecting the outermost nipple and its extension from within the bore thereof with said tool, and an insulated protection for said sleeve.

22. An accessory table comprising a casing, power dispensing devices disposed in said casing, and including electrical terminals and air connections, a tubular flexible conductor attached to said air connection and terminating at its free end in a tool arranged to be withdrawn and retracted with respect to said table, a splicer included in said flexible conductor, whereby portions of said conductor may be relatively separated, and comprising oppositely directed tubular nipples each having relatively opposed tubular extensions insulated from said nipples and arranged to be relatively engaged in separable threaded relation, a sleeve electrically connecting said nipples and embracing said extensions but spaced therefrom, electrical conductors extended through said tubular conductor and respectively connecting the innermost nipple and its extension from within the bore thereof with said electrical terminals, electrical conductors extended through said tubular conductor and respectively connecting the outermost nipple and its extension from within the bore thereof with said tool, an insulated protection for said sleeve having circumferential grooves, and an attachment having spring clips arranged to embrace said splicer in engagement with said grooves.

23. An accessory table comprising a casing, power dispensing devices disposed in said casing, and including electrical terminals and air connections with a hollow fitting having a nipple insulated therefrom and provided with a relatively insulated extension in threaded engagement with a retainer arranged to secure said nipple to the fitting body, terminal clips interposed between said nipple and fitting and between said fitting and retainer, insulation between terminal clips and said fitting, conductors connecting said terminal clips with said electric terminals, a tubular flexible conductor attached to said nipple and terminating at its free end in a tool arranged to be withdrawn and retracted with respect to said table, and electrical conductors extended through said tubular conductor and respectively connecting said nipple and said extension from within the bore thereof with said tool.

24. An accessory table comprising a base plate having a plurality of standards, a plurality of units arranged to be stacked one upon the other and to be supported in relatively spaced relation on said standards, each of said units comprising a flange embracing a central opening and forming a chamber, and an annular tray rotatably mounted thereon and embracing said chamber.

25. An accessory table comprising a base plate having a plurality of standards, a plurality of units arranged to be stacked one upon the other, each comprising a support having a carrier rotatably mounted thereon, spacing means on said standards arranged to relatively space the lowermost unit from said base plate and said units from each other, a cover plate engaged with said standards and arranged to form a closure with said base plate for said units, and a spring interposed between said cover plate and the uppermost unit tending to hold said units and spacing means in relative contact.

26. An accessory table comprising a base plate having a plurality of standards, a plurality of units arranged to be stacked one upon the other in removable relation upon said base plate, each comprising a support having a carrier rotatably mounted thereon and having apertures through which said supports extend, means arranged to maintain said units in a predetermined spaced relation, a cover plate supported upon said standards, and yielding means cooperative with said spacing means arranged to prevent accidental displacement of said units.

27. An accessory table comprising a base plate having a plurality of standards, a plurality of units arranged to be stacked one upon the other upon said base plate, each comprising a support having a carrier rotatably mounted thereon and having apertures through which said standards extend, spacing sleeves forming feet for said supports arranged to maintain said units in a predetermined relatively spaced relation, a cover plate supported upon said standards and engaged therewith to form a closure with said base for said units, and yielding means arranged to prevent displacement of said units.

28. An accessory table comprising a base plate having a plurality of posts forming standards projecting upwardly therefrom, a plurality of units arranged to be stacked one upon the other upon said base, each comprising a support having a carrier rotatably mounted thereon and having apertures through which said posts extend, spacers disposed between said base and the lowermost unit and between the respective units arranged to maintain said units in a predetermined relatively spaced relation, and a cover plate supported upon said posts and engaged therewith to form a closure with said base for said units.

29. An accessory table comprising a base plate having a plurality of posts forming standards projecting upwardly therefrom, a plurality of units arranged to be stacked one upon the other upon said base, each comprising a support having a carrier rotatably mounted thereon and having apertures through which said posts extend, spacers disposed between said base and the lowermost unit and between the respective units arranged to maintain said units in a predetermined relatively spaced relation, a cover plate supported upon said posts and engaged therewith to form a closure with said base for said units, and a lateral housing removably engaged with the peripheral edges of said base plate and cover plate.

30. An accessory table comprising a base plate having a plurality of posts forming standards projecting upwardly therefrom, a plurality of units arranged to be stacked one upon the other upon said base, each comprising a support having a carrier rotatably mounted thereon and having apertures through which said posts extend, spacers disposed between said base and the lowermost unit and between the respective units arranged to maintain said units in a predetermined relatively spaced relation, a cover plate supported upon said posts and engaged therewith to form a closure with said base for said units, and a lateral housing comprising a plurality of relatively removable sections engaged with the peripheral edges of said base plate and cover plate.

31. An accessory table comprising a base plate having a plurality of posts forming standards projecting upwardly therefrom, a plurality of units arranged to be stacked one upon the other upon said base, each comprising a support having a carrier rotatably mounted thereon and having apertures through which said posts extend, spacers disposed between said base and the lowermost unit and between the respective units arranged to maintain said units in a predetermined relatively spaced relation, a cover plate supported upon said posts and engaged therewith to form a closure with said base for said units, and a lateral housing comprising separately removable housing sections engaged with the peripheral edges of said base plate and cover plate, and means yieldingly engaged with said base plate and cover plate to which said sections are attached.

32. An accessory table comprising a casing having upper and lower relatively spaced plates having outwardly directed apertures disposed in the peripheral margins thereof, a lateral housing engaged with the peripheral edges of said plates, and a spring yoke terminating in inclined hooks engaging said apertures and having an outwardly extended central region to which said housing may be secured.

33. An accessory table comprising a casing having relatively spaced upper and lower plates provided with outwardly inclined apertures in their peripheral margins and having their peripheral edges rabbeted, a housing engaged with the rabbeted edges of said plates, and a spring yoke connected with said housing and terminating in outwardly inclined hooks arranged to be sprung into said apertures.

34. An accessory table comprising a casing having upper and lower plates provided with apertures in their peripheral margins and having annular grooves in their oppositely directed surfaces and having their peripheral edges rabbeted, a lateral housing engaged with said rabbeted peripheral edges, a spring yoke connected with said housing and having hooks arranged to be sprung into said apertures, and a closure having annular sectors arranged to slide in said annular grooves.

35. An accessory table comprising a casing having relatively spaced horizontally disposed plates provided with outwardly inclined apertures in their peripheral margins, annular grooves in their oppositely directed surfaces and rabbeted peripheral edges, a lateral housing formed of a plurality of circular sections having their inner edges engaged with the rabbeted periphery of said plates, spring yokes connected with the respective housing sections having outwardly inclined hooked terminations engaged in said apertures, shoes in the form of annular sections arranged to slide in said grooves, and a closure arranged to embrace said housing and the peripheral margin of said plates detachably engaged with said shoes.

36. An accessory table comprising a casing having relatively spaced horizontal plates provided with outwardly directed inclined apertures in their peripheral margins and having annular grooves in their oppositely directed surfaces, a lateral housing provided with a projecting bead, a spring yoke connected with said housing and terminating in outwardly inclined terminal hooks arranged to be sprung into said apertures, slide shoes engaged in said grooves, a slidable closure detachably secured to said slide shoes and embracing said housing and the peripheral margins of said plates, the ends of said closure being formed to engage said bead respectively in its open and closed positions.

37. An accessory table comprising a casing having relatively spaced horizontal plates provided with outwardly directed inclined apertures in their peripheral margins and having annular grooves in their oppositely directed surfaces, a lateral housing provided with a projecting bead, a spring yoke connected with said housing and terminating in outwardly inclined terminal hooks arranged to be sprung into said apertures, slide shoes engaged in said grooves, a slidable closure detachably secured to said slide shoes and embracing said housing and the peripheral margins of said plates, the ends of said closure being formed to engage said bead to limit its movement, and a handle on said closure having a spring latch arranged to engage said bead when said closure is in open position.

38. An accessory table comprising a casing mounted to rotate and to swing into different positions and comprising relatively spaced horizontal plates, a lateral housing removably engaged with said plates and affording a projection, a slidable closure arranged to embrace said housing and connected with said plates to slide circularly around said housing and having its opposite ends formed to engage said projection, a handle on said slidable closure, a spring latch associated with said handle cooperative with said projection to engage said slidable closure with said housing to afford means including said handle by which said table may be moved into relatively different positions.

39. An accessory table comprising a casing, power dispensing devices disposed in said casing and having electrical terminals and air connections including a hollow fitting having a nipple comprising relatively insulated tubular sections removably engaged with said fitting, means arranged to secure said nipple to said fitting, terminal clips respectively engaged by said means with the relatively insulated sections of said nipple, electrical connections between said clips and said electrical terminals, a tubular conductor removably attached to said nipple, and electrical conductors extended through said tubular conductor and respectively attached to said relatively insulated sections from within the bore thereof.

40. An accessory table comprising a casing, power dispensing devices disposed in said casing and having electrical terminals and air connections including a hollow fitting having a nipple comprising relatively insulated tubular sections removably engaged with said fitting, means arranged to secure said nipple to said fitting, terminal clips respectively engaged by said means with the relatively insulated sections of said fitting, electrical connections between said clips and said electrical terminals, a flexible tubular conductor removably connected with said nipple and terminating in a tool extended exterior to said casing, electrical conductors extended through said tubular conductor from said tool and respectively attached to said relatively insulated sections from within the bore thereof, and means exterior to said casing arranged to control said power dispensing devices.

41. An accessory table comprising a casing, power dispensing devices disposed in said casing and having electrical terminals and air connections including a hollow fitting providing a bore therein having relatively different diameters, a nipple comprising relatively insulated tubular sections removably engaged with said fitting and extended through said bore and having an opening therein in communication with the enlarged portion of the bore of said fitting, means arranged to secure said nipple to said fitting, terminal clips engaged by said means with the relatively insulated sections of said fitting, electrical connections between said clips and said electrical terminals, a tubular conductor removably attached to said nipple, and electrical conductors extended through said tubular conductor and respectively attached to said relatively insulated sections from within the bore thereof.

42. An accessory table comprising a casing, power dispensing devices disposed in said casing and respectively having electrical terminals and air connections including a hollow fitting provided with a bore having relatively different diameters, a tubular nipple fitted into the smaller diameter of said fitting and provided with an aperture communicating with the annular space afforded by the larger diameter of said fitting and comprising relatively insulated sections, insulation disposed between said fitting and said sections, terminal clips engaged between said sections and said fitting with said insulation interposed between said clips and said fitting, and a threaded cap engaged with one of said sections and arranged to form a terminal closure for the bore of said nipple, a flexible tubular conductor engaged with said nipple, electrical conductors extended through said flexible conductor and through the bore of said nipple and engaged from within said bore to said sections, and electrical connections between said clips and said electrical terminals.

43. An accessory table comprising a casing, power dispensing devices disposed in said casing respectively having electrical terminals and air pipe connections, means extended exterior to said casing arranged to be manually manipulated to control said power dispensing devices, a hollow fitting disposed within said casing and having the hollow thereof connected with the air pipe connection of said power dispensing device, a tubular nipple comprising relatively insulated sections extended through said fitting and having an aperture in communication with said air pipe connection through the hollow of said fitting, a tubular flexible conductor attached to said nipple, and electrical conductors extended through said flexible tubular conductor and through the bore of said nipple and having electrical connections from within said bore through said sections to said electrical terminals.

44. An accessory table comprising a casing, power dispensing devices disposed in said casing and having electrical terminals and air connections including a hollow fitting having a nipple comprising relatively insulated tubular sections removably engaged with said fitting, means arranged to secure said nipple to said fitting, terminal clips respectively engaged by said means with the respective insulated sections of said fitting, electrical connections between said clips and said electrical terminals, a flexible tubular conductor connected with said nipple and terminating in a tool extended exterior to said casing, said flexible tubular conductor comprising separable sections, a splicer arranged to connect said separable sections and comprising oppositely directed tubular nipples each having relatively opposed tubular extensions insulated from said nipples and arranged to be relatively engaged in separable relation, a sleeve electrically connecting said nipples and embracing said extensions but spaced therefrom, electrical conductors extended through said tubular conductor and respectively connecting the innermost splicer nipple and its extension from within the bore thereof with the insulated tubular sections of the nipple in said fitting, and electrical conductors extended through said tubular conductor respectively connecting the outermost nipple and its extension from within the bore thereof with said tool.

45. An accessory unit comprising a support, a carrier rotatably mounted on said support, a flexible conductor coiled on said carrier arranged to connect a relatively movable tool at its outer end with a stationary source of power supply at its inner end and being secured intermediate of its ends to said rotary carrier by a splicer comprising oppositely directed nipples with which the spliced opposed ends of said flexible conductor are attached, each of said nipples being provided with an extension insulated therefrom, one being internally threaded and the other externally threaded whereby said nipples may be rotated to engage and disengage each other, a sleeve embracing said nipples and forming metallic contact therebetween but insulated from their respective extensions, electrical conductors extended through said flexible tubing respectively connected with said nipples and with their extensions through the bore thereof whereby threaded connection between the spliced ends of said flexible tubing may be effected to simultaneously form an air-tight seal for the tubing and complete the electrical circuit therethrough.

46. An accessory table comprising a unit having a stationary support, a carrier mounted to rotate on said support, a flexible conductor spirally coiled on said carrier and having one end secured to said support and the other end terminating in a relatively movable instrument arranged to be withdrawn from said unit and retracted thereto, a spiral spring interposed between the coils of said conductor and having notches in the edge thereof adjacent to its opposite ends, spring clips respectively mounted on said support and on said carrier formed of sheet material and comprising a lug forming a bar under which the ends of said spring may be hooked to engage said bar with said notch.

47. An accessory table comprising a unit having a stationary support, a carrier mounted to rotate on said support, a flexible conductor spirally coiled on said carrier and having one end secured in stationary relation to said support and the other end terminating in a relatively movable instrument arranged to be withdrawn from said unit and retracted thereto, a spiral spring interposed between the coils of said conductor and having notches in the edge thereof adjacent to its opposite ends, spring clips respectively mounted on said support and on said carrier and having means arranged to engage the notches in the edge of said spring, said spring being engaged therewith and disengaged therefrom by canting the end thereof with respect thereto.

48. An accessory table comprising a unit having a stationary support, a carrier mounted to rotate on said support, a flexible conductor spirally coiled on said carrier and having one end secured in stationary relation to said support and the other end terminating in a relatively movable instrument arranged to be withdrawn from said unit and retracted thereto, a spiral spring interposed between the coils of said conductor and having notches in the edge thereof adjacent to its opposite ends, spring clips respectively mounted on said support and on said carrier formed of folded sheet material and affording a bar arranged to engage the notches on said spring, said spring being engaged therewith and disengaged therefrom by respectively canting the spring with respect thereto.

49. In an accessory table the combination with a supporting bracket arranged to swing the table into different relative positions and to permit rotation of the table thereon about its own axis, of a casing in which is enclosed a transformer, means arranged to control said transformer, a unit embracing said transformer and comprising a support, a tray rotatably mounted on said support, a flexible conductor spirally coiled on said tray and attached thereto intermediate of its length and leading from said transformer to an instrument that may be drawn outwardly from said table and returned thereto while connected with said transformer, and means tending to rotate said tray to effect retraction of said instrument.

50. In an accessory unit comprising a support, a tool holder mounted on said support, an operative tool normally engaged in said holder when not in use and arranged to be withdrawn therefrom for operative purposes, a carrier rotatably mounted with respect to said support and having means about which a flexible conductor may be wrapped, a flexible conductor coiled with respect to said carrier within said means and engaged therewith and having a portion wrapped about said means and terminating in said tool, means tending to effect rotation of said carrier to retract said tool when withdrawn, a wedge-block inclined to said carrier, a roller supported by said wedge-block and arranged to roll between said carrier and wedge-block to arrest the rotation of said carrier in the direction tending to effect retraction of said tool, tripping means arranged to shift said roller from its jammed position to effect release of said carrier from any rotary position.

51. An accessory unit comprising a support, a tool holder mounted on said support, an operative tool normally engaged in said holder when not in use and arranged to be withdrawn therefrom for operative purposes, a carrier rotatably mounted with respect to said support and having means about which a flexible conductor may be wrapped, a flexible conductor coiled with respect to said carrier within said means and engaged therewith and having a portion wrapped about said means and terminating in said tool, means tending to effect rotation of said carrier to retract said tool when withdrawn, a wedge-block inclined to said carrier, and a roller supported by said wedge-block and arranged to roll between said carrier and wedge-block to arrest the rotation of said carrier in the direction tending to effect retraction of said tool.

52. An accessory unit comprising a support, a tool holder mounted on said support, an operative tool normally engaged in said holder when not in use and arranged to be withdrawn therefrom for operative purposes, a carrier rotatably mounted with respect to said support and having means about which a flexible conductor may be wrapped, a flexible conductor coiled with respect to said carrier within said means and engaged therewith and having a portion wrapped about said means and terminating in said tool, means tending to effect rotation of said carrier to retract said tool when withdrawn, a wedge-block mounted on said support and having a channel inclined to said carrier, a roller mounted to roll in said channel and to tilt into engagement with said carrier and tending to jam between said block and carrier upon rotation of the carrier in the direction tending to effect retraction of said tool.

53. An accessory unit comprising a support, a tool holder mounted on said support, an operative tool normally engaged in said holder when not in use and arranged to be withdrawn therefrom for operative purposes, a carrier rotatably mounted with respect to said support and having means about which a flexible conductor may be wrapped, a flexible conductor coiled with respect to said carrier within said means and engaged therewith and having a portion wrapped about said means and terminating in said tool, means tending to effect rotation of said carrier to retract said tool when withdrawn, a wedge-block inclined to said carrier, a roller supported by said wedge-block and arranged to roll between said carrier and wedge-block to arrest the rotation of said carrier in the direction tending to effect retraction of said tool, tripping means arranged to shift said roller from its jammed position to effect release of said carrier from any rotary position, and means actuated by the movement of said tool to the limit of its outer movement arranged to effect release of said carrier and consequent retraction of said tool.

54. An accessory unit comprising a support, a tool holder mounted on said support, an operative tool normally engaged in said holder when not in use and arranged to be withdrawn therefrom for operative purposes, a carrier rotatably mounted with respect to said support and having means about which the flexible conductor may be wrapped, a flexible conductor coiled with respect to said carrier and engaged therewith and having its outer portion wrapped about said means and terminating in said tool, the spring tending to effect rotation of said carrier to retract said tool when withdrawn, and a lock arranged to engage said carrier and to hold said flexible conductor with the tool extended in different operative distances therefrom, comprising a wedge-block and a roller engaged with said wedge-block and held clear of said support and so tilted against said carrier as to be rolled by the rotation of the carrier into jammed position between said carrier and wedge-block.

55. An accessory unit comprising a support, a tool holder mounted on said support, an operative tool normally engaged in said holder when not in use and arranged to be withdrawn therefrom for operative purposes, a carrier rotatably mounted with respect to said support and having means about which the flexible conductor may be wrapped, a flexible conductor coiled with respect to said carrier and engaged therewith and having its outer portion wrapped about said means and terminating in said tool, the spring tending to effect rotation of said carrier to retract said tool when withdrawn, and a lock comprising a wedge-block and a roller so engaged with said carrier as to roll between said wedge-block and said carrier to effect the arrest of said carrier in different relative positions.

56. An accessory unit comprising a support, a tool holder mounted on said support, an operative tool normally engaged in said holder when not in use and arranged to be withdrawn therefrom for operative purposes, a carrier rotatably mounted with respect to said support and having means about which the flexible conductor may be wrapped, a flexible conductor coiled with respect to said carrier and engaged therewith and having its outer portion wrapped about said means and terminating in said tool, a spring tending to effect rotation of said carrier to retract said tool when withdrawn, and a lock comprising wedging means arranged to engage said carrier to arrest it in relatively different positions, and means on said carrier cooperative to effect the release of said locking means when said tool has been extended to the limit of its withdrawn movement.

57. An accessory unit comprising a support, a tool holder mounted on said support, an operative tool normally engaged in said holder when not in use and arranged to be withdrawn therefrom for operative purposes, a carrier rotatably mounted with respect to said support and having means about which the flexible conductor may be wrapped, a flexible conductor coiled with respect to said carrier and engaged therewith and having its outer portion wrapped about said means and terminating in said tool, the spring tending to effect rotation of said carrier to retract said tool when withdrawn, and a lock comprising wedging means arranged to arrest the rotation of said carrier in the direction to retract said tool, a tripping device arranged to be manually operative to effect release of said locking means, and means on said carrier arranged to engage said tripping device to release said locking device when said tool is withdrawn to the limit of its movement.

58. In an accessory table, the combination with a casing, of a plurality of separate relatively movable units comprising a transformer, a plurality of pressure reducing valves, means extending exterior to said casing arranged to separately control said transformer and valves, a plurality of units stacked one upon the other and comprising a support arranged to embrace said transformer and valve each having an annular tray rotatably mounted thereon and encircling said transformer and valves, a conductor coiled upon each of said trays and connected intermediate of its ends therewith, the inner ends of said conductors being respectively connected with said transformer and valves and terminating in instruments extended through said casing and arranged to be withdrawn from said table and retracted thereto, and a laminated spring spirally coiled in interposed relation with the coils of said conductors and having its opposite ends respectively connected with said support and said tray tending to so effect rotation of said tray as to retract said instrument when withdrawn from said table.

59. In an accessory table comprising a casing including a removable lateral housing, the combination with a supporting bracket arranged to swing said table into different relative positions and to permit its rotation about its own axis of support, a transformer connected through said bracket with a source of power supply, means arranged to control the current passing through said transformer, means to regulate the induced current from said transformer, a plurality of units embracing said transformer comprising a support, a tray rotatably mounted on said support, a flexible conductor spirally coiled on said tray and connected therewith intermediate of its ends, one end being connected with said transformer and the other end terminating in a tool which may be extended from said table and retracted thereto, a laminated spring interposed between the coils of said conductor and having its respective ends attached to said support and to said tray arranged to so effect the rotation of said tray as to tend to retract said instrument to said table.

60. As an auxiliary to an accessory table comprising a base plate and a cover plate and a lateral housing connecting said plates and forming a closure, of operating mechanism disposed within said table and including electrical connecting terminals having connections leading from a source of electrical energy; a block distinct from the table structure removably secured to one of the plates and having spring contacts therein in registry with suitably provided openings in said plate, electrical conductors extending between said electrical connecting terminals and the spring contacts in said block, a hollow bracket detachably engaged with said plate and extending outwardly beyond said housing and independent thereof, a warming device mounted on said bracket exterior to said housing, electrical conductors connected with said warming device and extending through said bracket and respectively terminating in contact points projected through said apertures and arranged to electrically engage said spring contacts when said bracket is attached to said plate.

61. As an auxiliary to an accessory table comprising a base plate and a cover plate having a central opening and including a lateral housing removably connected with said plates, of operative mechanism disposed within said table and including electrical connecting terminals having connections leading from a source of electrical energy and accessible through said opening; a block secured to said base plate within said table and having spring contacts therein in registry with suitably provided apertures in said plate, electrical conductors extending between said electrical connecting terminals and the spring contacts in said block, of a unit comprising a hollow bracket secured to the under side of said base plate and extended free from said lateral housing and having an electrically actuated device mounted thereon exterior to said housing and providing a receptacle for containers to be warmed, and conductors leading through said bracket and connecting said warming device with contacts leading through said apertures in electrical engagement with said spring contacts.

62. In an accessory table, the combination with a stand having a distributing head provided with a bearing, of an articulated bracket comprising a main-arm rotatably mounted on said head and a forearm rotatably mounted on said main-arm and supporting said table for relative rotation, controlling devices including a transformer disposed in said table and conductors leading from a source of supply through said stand to said head, connections disposed in said head for said conductors, and conductors connecting said connections in said head with the controlling devices within said table.

63. In an accessory table, the combination with a stand having a hollow distributing head, of an articulated hollow bracket comprising a main-arm rotatably mounted on said head, a forearm rotatably mounted on said main-arm and supporting said table for independent rotation thereon, controlling devices including a transformer disposed within said table, conductors leading from said controlling devices through said bracket into said head, conductors leading from a source of power supply through said stand and into said head, connections within said head for said conductors.

64. In an accessory table, the combination with a stand having a hollow distributing head affording a bearing, of an articulated bracket arranged to rotatably support said table on said head and comprising a main-arm and a forearm, said main-arm being supported for rotation on the bearing on said head and having its forward end terminating in cupped formation affording a bearing, the inner end of said forearm being rotatably supported on the bearing provided by said cup and the forward end of said forearm terminating in an annulus affording a bearing upon which said table may be independently rotated, connections disposed within said head, and conductors leading from different sources of power supply through said stand to the connections in said head, controlling devices including a transformer disposed in said table, conductors connecting said controlling devices with the connections in said head.

65. In a bracket table, the combination with a stand having a distributing hollow head affording a bearing, of an articulated bracket comprising a main-arm and forearm rotatably mounted on the bearing of said head and terminating forwardly in cupped formation having a bearing surface, the inner end of said forearm terminating in an annulus affording an inturned flange rotatably supported on said bearing, a cylindrical retainer having a peripheral flange overlying said inturned flange, means connected with said retainer to adjustably vary the friction of said annulus on said bearing, the outer end of said forearm terminating in an annulus and affording a bearing upon which said table may rotate, a cylindrical retainer arranged to engage said table with said bearing and means arranged to adjust said retainer to vary the friction of said table on its bearing.

66. In a bracket table, the combination with a stand having a distributing hollow head affording a bearing, of an articulated bracket comprising a main-arm and forearm rotatably mounted on the bearing of said head and terminating forwardly in cupped formation having a bearing surface, the inner end of said forearm terminating in an annulus affording an inturned flange rotatably supported on said bearing, a retainer having a peripheral flange overlying said inturned flange, means connected with said retainer to adjustably vary the friction of said annulus on said bearing, the outer end of said forearm terminating in an annulus and affording a bearing upon which said table may rotate, a retainer arranged to engage said table with said bearing, means arranged to adjust said retainer to vary the friction of said table on its bearing, controlling devices including a transformer disposed within said table, flexible conductors connecting said controlling devices with operative tools arranged to be withdrawn from said table and retracted thereto, conductors leading from said controlling devices through the bracket head and stand to sources of power supply.

67. In a bracket table, the combination with a stand having a hollow distributing head, of an articulated bracket rotatably supporting said table in swingable relation about said stand and comprising a main-arm and forearm, said main-arm being rotatably mounted to swing about said head and terminating forwardly in cupped formation affording a bearing, the forearm terminating inwardly in an annulus having an inturned flange, a retainer adjustably supported in said cup and having a laterally disposed flange overlapping the flange of said annulus, a removable cap for said annulus, the forward end of said forearm terminating in an enlarged annulus affording a bearing for said table, a retainer adjustably mounted in said annulus and having a laterally disposed flange arranged to engage said table rotatably mounted on said forearm, a removable closure arranged to close said forwardly disposed annulus, and a conduit supported by said plate and having a tang extended between said plate and said forearm, and electrical conductors connecting said transformer through said controlling device and extended through said conduit, bracket arm and stand to a source of power supply.

68. An accessory table comprising a casing having apertures in its outer walls, tool holders associated with said apertures, tools mounted in said holders when not in use and arranged to be withdrawn therefrom and retracted thereto, power dispensing means within said casing, conductors connecting said tools with said power dispensing means, a bracket upon which said table is rotatably mounted, a stop on said bracket, a plug receptacle depending from said casing with which the plug of an electrical device may be engaged, electrical connections between said plug receptacle and dispensing means, and buffer means on said plug receptacle arranged to engage the stop on said bracket to limit the rotary movement of said table.

69. An accessory unit comprising a rotatable carrier including an annular tray embracing power actuating means and having a peripheral flange provided with apertures, a flexible conductor arranged to connect said power actuating means with an operative instrument and having its inner portion spirally coiled upon said tray and its outer portion extended exterior to said flange and wound thereabout so as to be drawn therefrom tangentially to permit said instrument to be moved into relatively different operative positions, and a cover having means arranged to enter said apertures to removably engage it with said tray and thereby confine the coils of said spirally coiled conductor in a restricted area therein.

70. An accessory unit comprising a rotatable carrier having a flange provided with apertures, a flexible conductor arranged to connect a source of power supply with an operative instrument and having a portion of its length spirally coiled about said tray and extended exterior to said flange and wound thereabout so as to be drawn therefrom tangentially to permit said instrument to be moved into relatively different operative positions, a spring spirally coiled in interposed relation with respect to the coils of said conductor tending to rotate said carrier to effect retraction of said instrument when withdrawn, and a retainer arranged to engage said apertures to prevent accidental displacement of said conductor from between the coils of said spring.

71. An accessory table arranged to be rotatably mounted on a bracket arm and comprising a casing having a central opening in its lower wall communicating with said bracket and an aperture disposed at one side of said opening, a channel bar having a closure and providing a passageway having an inlet and outlet respectively communicating through said opening and through said aperture, means connecting said inlet with a source of fluid supply, and a conduit connected with said outlet embracing said casing and having a burner disposed over the upper plate of said casing.

72. An accessory supporting device, comprising a base, power controlling devices supported on said base, a plurality of spaced annular supports superimposed one upon another on said base and embracing said power controlling devices and respectively supporting rotary carriers each carrying a conductor coiled thereon respectively connecting for relative movement instruments for operative purposes with the power controlling devices.

73. A splicer for a flexible tubular conductor comprising oppositely directed tubular nipples each having relatively opposed tubular extensions insulated from said nipples and arranged to be relatively engaged in separable threaded relation, a sleeve electrically connecting said nipples and embracing said extensions but spaced therefrom, electrical conductors extended through said tubular conductor and respectively connecting the innermost nipple and its extension from within the bore thereof with the electrical terminals, and electrical conductors extended through said tubular conductor and respectively connecting the outermost nipple and its extension from within the bore thereof with a tool.

74. A splicer for a flexible tubular conductor whereby portions of said conductor may be relatively separated, and comprising oppositely directed tubular nipples each having relatively opposed tubular extensions insulated from said nipples and arranged to be relatively engaged in separable threaded relation, a sleeve electrically connecting said nipples and embracing said extensions but spaced therefrom, electrical conductors extended through said tubular conductor and respectively connecting the innermost nipple and its extension from within the bore thereof with the electrical terminals, electrical conductors extended through said tubular conductor and respectively connecting the outermost nipple and its extension from within the bore thereof with a tool, and an insulated protection for said sleeve.

75. A splicer for a tubular flexible conductor comprising oppositely directed nipples with which the spliced opposed ends of said flexible conductor are attached, each of said nipples being provided with an extension insulated therefrom, one being internally threaded and the other externally threaded whereby said nipples may be rotated to engage and disengage each other, a sleeve embracing said nipples and forming metallic contact therebetween but insulated from their respective extensions, electrical conductors extended through said flexible tubing respectively connected with said nipples and with their extensions through the bore thereof whereby threaded connection between the spliced ends of said flexible tubing may be effected to simultaneously form an air-tight seal for the tubing and complete the electrical circuit therethrough.

ROBERT C. ANGELL.